(12) United States Patent
Suzuki et al.

(10) Patent No.: US 10,144,293 B2
(45) Date of Patent: Dec. 4, 2018

(54) DRIVING FORCE CONTROL DEVICE AND DRIVING FORCE CONTROL METHOD

(71) Applicant: HITACHI AUTOMOTIVE SYSTEMS, LTD., Hitachinaka-shi, Ibaraki (JP)

(72) Inventors: Keisuke Suzuki, Kawasaki (JP); Hitoshi Kobayashi, Machida (JP); Tatsuyuki Yamamoto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 293 days.

(21) Appl. No.: 15/021,197

(22) PCT Filed: Sep. 10, 2014

(86) PCT No.: PCT/JP2014/073924
§ 371 (c)(1),
(2) Date: Mar. 10, 2016

(87) PCT Pub. No.: WO2015/037615
PCT Pub. Date: Mar. 19, 2015

(65) Prior Publication Data
US 2016/0221446 A1 Aug. 4, 2016

(30) Foreign Application Priority Data
Sep. 12, 2013 (JP) ................. 2013-189386

(51) Int. Cl.
*B60L 3/10* (2006.01)
*B60L 15/20* (2006.01)
(Continued)

(52) U.S. Cl.
CPC ............... *B60L 3/106* (2013.01); *B60L 3/108* (2013.01); *B60L 7/14* (2013.01); *B60L 11/1803* (2013.01);
(Continued)

(58) Field of Classification Search
CPC combination set(s) only.
See application file for complete search history.

(56) References Cited

U.S. PATENT DOCUMENTS 5,345,155 A 9/1994 Masaki et al.
5,584,541 A 12/1996 Sone et al.
(Continued)

FOREIGN PATENT DOCUMENTS

EP 2 106 955 A1 10/2009
JP H03-086636 A 4/1991
(Continued)

*Primary Examiner* — Thomas G Black
*Assistant Examiner* — Ana D Thomas
(74) *Attorney, Agent, or Firm* — Foley & Lardner LLP

(57) ABSTRACT

Provided is a driving force control device capable of stabilizing a vehicle behavior when a driving torque of a drive wheel is controlled. When slip suppression control is carried out to decrease a driving torque of a drive source that is connected to the drive wheel of a vehicle via a speed reduction mechanism and a drive shaft, and is configured to generate a torque for braking or driving the drive wheel, to thereby suppress a slip state of the drive wheel, the driving torque of the drive source is controlled so that a slip ratio of the drive wheel is in an area of the slip ratio smaller than a slip ratio corresponding to a peak value of a road surface friction coefficient in a characteristic of the road surface friction coefficient with respect to the slip ratio.

20 Claims, 14 Drawing Sheets

(51) Int. Cl.
*B60W 10/08* (2006.01)
*B60L 7/14* (2006.01)
*B60L 11/18* (2006.01)
*B60W 10/184* (2012.01)
*B60W 30/18* (2012.01)
*B60T 8/175* (2006.01)
*B60T 8/1763* (2006.01)

(52) U.S. Cl.
CPC ....... *B60L 11/1868* (2013.01); *B60L 11/1877* (2013.01); *B60L 15/20* (2013.01); *B60L 15/2009* (2013.01); *B60T 8/175* (2013.01); *B60T 8/17636* (2013.01); *B60W 10/08* (2013.01); *B60W 10/184* (2013.01); *B60W 30/18172* (2013.01); *B60L 2210/10* (2013.01); *B60L 2240/12* (2013.01); *B60L 2240/423* (2013.01); *B60L 2240/461* (2013.01); *B60L 2240/465* (2013.01); *B60L 2250/16* (2013.01); *B60L 2250/26* (2013.01); *B60L 2260/26* (2013.01); *B60L 2270/145* (2013.01); *B60W 2540/18* (2013.01); *B60W 2550/148* (2013.01); *B60W 2720/26* (2013.01); *Y02T 10/645* (2013.01); *Y02T 10/7005* (2013.01); *Y02T 10/7066* (2013.01); *Y02T 10/7216* (2013.01); *Y02T 10/7275* (2013.01)

(56) References Cited

U.S. PATENT DOCUMENTS

| | | | | |
|---|---|---|---|---|
| 5,964,819 | A * | 10/1999 | Naito | B62D 7/159 |
| | | | | 303/140 |
| 9,573,473 | B2 * | 2/2017 | Akiyama | B60L 3/102 |
| 9,931,962 | B2 * | 4/2018 | Suzuki | B60L 15/20 |
| 2007/0095585 | A1 * | 5/2007 | Imura | B60K 6/44 |
| | | | | 180/65.31 |
| 2013/0345917 | A1 | 12/2013 | Ozaki | |
| 2015/0142240 | A1 | 5/2015 | Ozaki | |
| 2015/0284005 | A1 * | 10/2015 | Suzuki | B60T 8/00 |
| | | | | 701/22 |
| 2016/0214486 | A1 * | 7/2016 | Suzuki | B60T 8/175 |
| 2016/0221446 | A1 * | 8/2016 | Suzuki | B60L 15/20 |
| 2016/0221467 | A1 * | 8/2016 | Suzuki | B60L 15/20 |

FOREIGN PATENT DOCUMENTS

| | | |
|---|---|---|
| JP | H03-227763 A | 10/1991 |
| JP | 2007-209068 A | 8/2007 |
| JP | 2009-083820 A | 4/2009 |
| JP | 2011-097826 A | 5/2011 |
| JP | 2012-186928 A | 9/2012 |

* cited by examiner (a)

(b)

(c)

DRIVING FORCE CONTROL DEVICE AND DRIVING FORCE CONTROL METHOD

TECHNICAL FIELD

The present invention relates to a driving force control device for a vehicle.

BACKGROUND ART

Hitherto, a technology described in Patent Literature 1 is known as a driving force control device for a vehicle. In this vehicle, in order to suppress a drive slip of a drive wheel, in an area including a μ peak of a μ-s characteristic curve representing a relationship between a slip ratio s and a friction coefficient μ between a tire and a road surface, a driving torque is controlled. As a result, both a stability performance and a traction performance are achieved.

CITATION LIST

Patent Literature

PTL 1: JP 2011-97826 A

SUMMARY OF INVENTION

Technical Problem

However, when the traction control is carried out in the area including the μ peak as described above, when a wheel on one side exceeds the μ peak, the slip ratio of this wheel exceeding the μ peak further increases. Thus, a difference in driving force is generated between the left and right wheels, and there arises such a problem that an unintended yaw moment is generated. The present invention has been made in view of the above-mentioned problem, and therefore has an object to provide a driving force control device and a driving force control method that are capable of stabilizing the vehicle behavior when the driving torque of the drive wheel is controlled.

Solution to Problem

In order to achieve the above-mentioned object, in a driving force control device according to one embodiment of the present invention, when slip suppression control is carried out to decrease a driving torque of a drive source that is connected to a drive wheel of a vehicle via a speed reduction mechanism and a drive shaft, and is configured to generate a torque for braking or driving the drive wheel, to thereby suppress a slip state of the drive wheel, the driving torque of the drive source is controlled so that a slip ratio of the drive wheel is in an area of the slip ratio smaller than a slip ratio corresponding to a peak value of a road surface friction coefficient in a characteristic of the road surface friction coefficient with respect to the slip ratio.

DESCRIPTION OF EMBODIMENTS

First Embodiment

Figure 1:
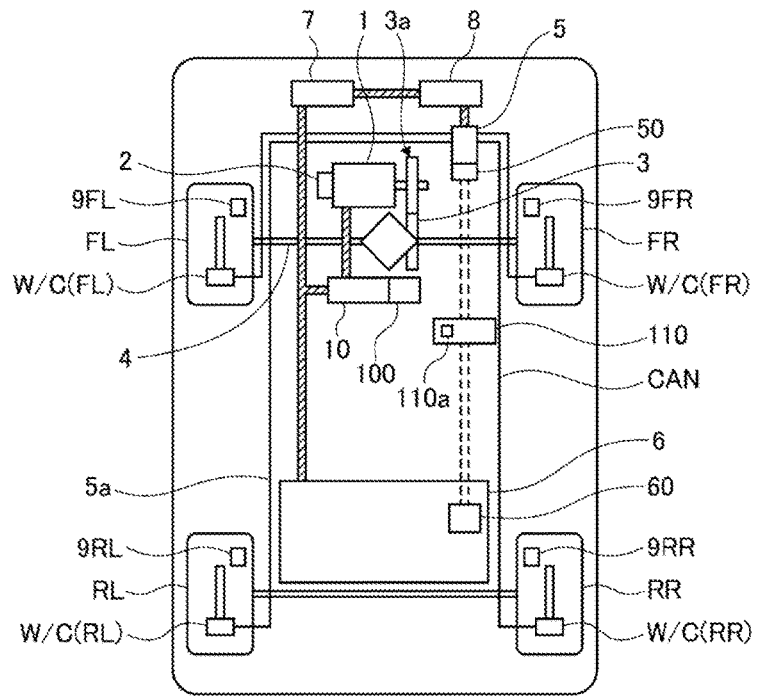
FIG. 1 is a system diagram for illustrating a configuration of an electric vehicle according to a first embodiment of the present invention.

FIG. 1 is a system diagram for illustrating a configuration of an electric vehicle according to a first embodiment of the present invention. The electric vehicle is a front wheel drive vehicle, and includes front wheels FL and FR, which are drive wheels, and rear wheels RL and RR, which are driven wheels. On each of the wheels, a wheel cylinder W/C (FL), W/C (FR), W/C (RL), or W/C (RR) (also simply referred to as W/C), which is configured to generate a friction braking force by pressing a brake pad to a brake rotor configured to integrally rotate with a tire, and a wheel speed sensor 9 (FL), 9 (FR), 9 (RL), or 9 (RR) (also simply referred to as 9), which is configured to detect a wheel speed of each wheel, are provided. To the wheel cylinder W/C, a hydraulic unit 5 is connected via a hydraulic pipe 5*a*.

The hydraulic unit 5 includes a plurality of solenoid valves, a reservoir, a pump motor, and a brake controller 50, and is configured to control, based on a command from the brake controller 50, drive states of the various solenoid valves and the pump motor, thereby controlling wheel cylinder hydraulic pressures for the respective wheels. Note that, the hydraulic unit 5 may be a widely known brake-by-wire unit, or a brake unit including a hydraulic circuit capable of carrying out vehicle stability control, and is thus not particularly limited.

On an electric motor 1, which is a drive source, a resolver 2 configured to detect a motor rotational angle is provided. To the electric motor 1, a differential gear 3 is connected via a speed reduction mechanism 3*a*, and, to a drive shaft 4 connected to the differential gear 3, the front wheels FL and FR are connected. On a rear part of the vehicle, a high-voltage battery 6 configured to supply an electric power for driving to the electric motor 1, or recover a regenerative electric power, and a battery controller 60 configured to monitor and control a battery state of the high-voltage battery 6 are mounted. An inverter 10 interposed between the high-voltage battery 6 and the electric motor 1 is controlled by a motor controller 100. Moreover, to the high-voltage battery 6, an accessory battery 8 is connected via a DC-DC converter 7 (component), and the accessory battery 8 functions as a power supply for driving of the hydraulic unit 5.

On the electric vehicle according to the first embodiment, a CAN communication line is provided, which is an onboard communication line to which a plurality of controllers installed on the vehicle are connected. The brake controller 50, a vehicle controller 110, the battery controller 60, and the like are connected for mutual information communication. Note that, a power steering controller 20 configured to control a power steering device configured to assist a steering operation by a driver and a meter controller 22 configured to control a speedometer configured to indicate a vehicle speed, which are not shown in FIG. 1, are connected to the CAN communication line. Moreover, on the power steering controller 20, a steering angle sensor 21 configured to detect a steering angle of a steering wheel is provided.

Figure 2:
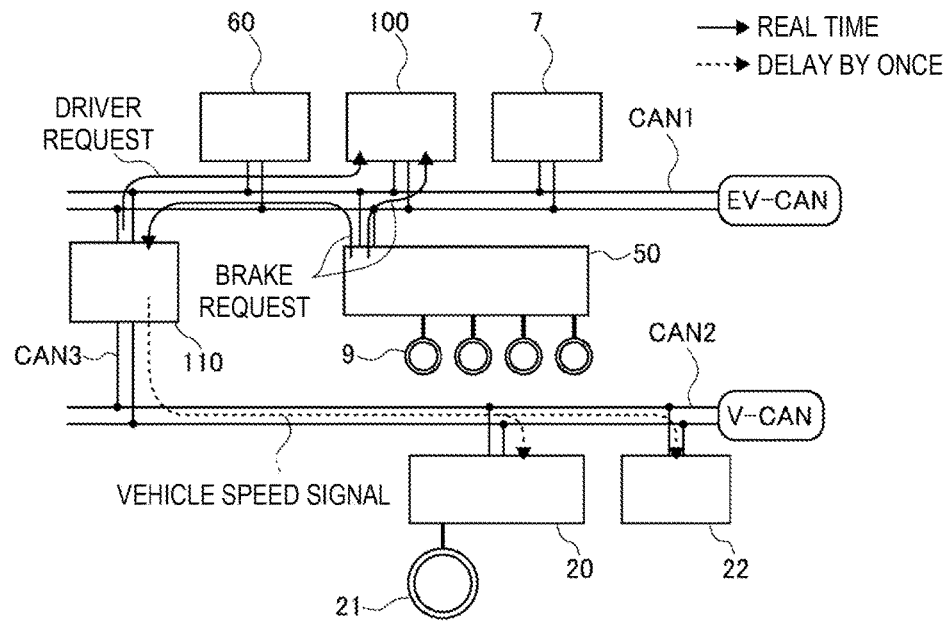
FIG. 2 is a schematic diagram for illustrating a connection state among various controllers according to the first embodiment.

FIG. 2 is a schematic diagram for illustrating a connection state of the various controllers according to the first embodiment. In the electric vehicle according to the first embodiment, the battery controller 60, the motor controller 100, the DC-DC converter 7, and the brake controller 50, which are configured to control a torque state acting between each of the drive wheels and the road surface, are grouped into a powertrain system, and are connected to a first CAN bus CAN1 (first communication device). Moreover, a chassis system including the power steering controller 20 and the meter controller 22 is connected to a second CAN bus CAN2 (second communication device).

The first CAN bus CAN1 and the second CAN bus CAN2 are connected with each other via a connection bus CAN3. On the connection bus CAN3, the vehicle controller 110 is provided, and information transmitted or received on the first CAN bus CAN1 is received by the vehicle controller 110 on the connection bus CAN3, and is then output to the second CAN bus CAN2. Similarly, information transmitted or received on the second CAN bus CAN2 is received by the vehicle controller 110 on the connection bus CAN3, and is then output to the first CAN bus CAN1.

(Connection Configuration of Controllers)

Figure 3:
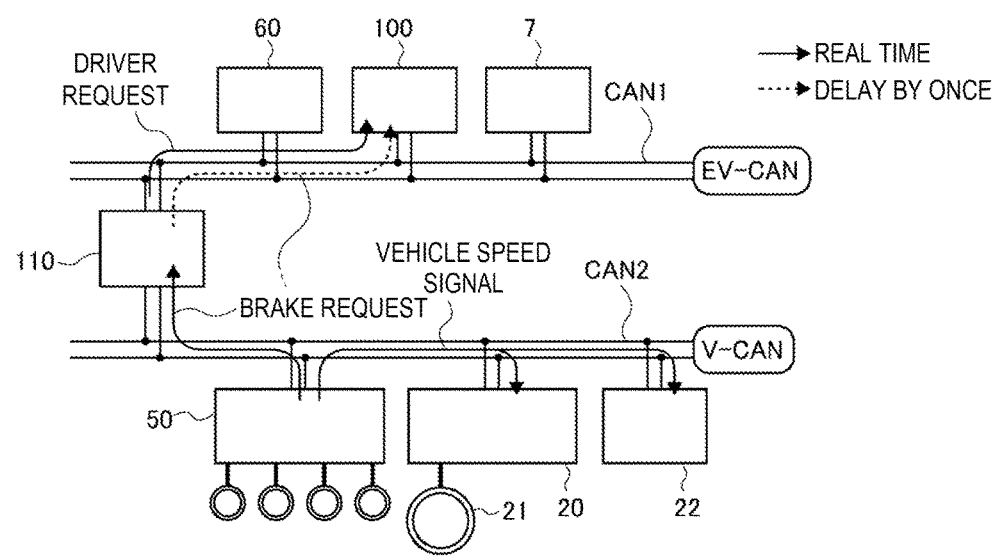
FIG. 3 is a schematic diagram for illustrating a connection state among various controllers according to a comparative example.

A description is now given of a reason for the configuration of the connection relationship among the controllers in comparison with a schematic diagram for illustrating the connection state of a comparative example. FIG. 3 is a schematic diagram for illustrating the connection state among the various controllers according to the comparative example. Hitherto, when a control system for a vehicle is constructed, as illustrated in FIG. 3, the brake controller 50 is connected to the second CAN bus CAN2. This is because, hitherto, the control for the brake system is included in control for the chassis system, and is thus not considered to be included in control for the powertrain system. For example, in terms of an increase in efficiency of a vehicle development, the respective systems such as the powertrain system, the brake system, a steering system, and a suspension system are often respectively developed as individual systems. When these individually developed systems are unified as an overall vehicle system, the unification is carried out by connection to a CAN communication line. The CAN communication line is limited in the number of controllers that can be connected, but can easily connect a plurality of controllers to be grouped. Thus, in the conventional system, the controllers are divided into a group in which the controllers in the chassis system are connected as a whole and a group in which the controllers in the powertrain system are connected as a whole, and, on the connection bus configured to connect between the respective groups, the vehicle controller is provided so as to control the entire vehicle.

On this occasion, in the configuration of the comparative example, a sufficient travel performance is hard to be secured in some cases. For example, at the time of vehicle start, when a driver excessively depresses an accelerator pedal and a large torque is output to the drive wheel, a drive slip may be generated. In order to suppress the drive slip, the brake controller 50 requests the vehicle controller 110 to suppress the slip state. Then, the vehicle controller 110 outputs a request such as a torque decrease to the motor controller 100 based on the request received from the brake controller 50.

However, such processing that the information sent on the second CAN bus CAN2 is once received by the vehicle controller 110, and then is sent on the first. CAN bus CAN1 is carried out. Therefore, the brake request output from the brake controller 50 is output to the motor controller 100 at a communication timing delayed by once. The delay is thus generated to cause a state in which the drive slip cannot be effectively suppressed. Particularly when the drive wheel slips, an inertia of the drive wheel is extremely less than an inertia of the vehicle, and a rotation state thus tends to abruptly change accordingly. Moreover, it is conceivable to increase a control gain or a communication speed, but the CAN communication line is designed so as to easily connect various additional systems. Therefore, even when the control gain and the control cycle of only the brake controller are increased, a limit is imposed by a communication speed on the CAN communication line, and it is thus difficult to secure a sufficient responsiveness.

Thus, according to the first embodiment, from such a viewpoint that the brake controller 50 is a system configured to control the torque between the drive wheel and the road surface, the brake controller 50 is included in the powertrain system, and is connected to the first CAN communication line CAN1. In this case, the vehicle speed information and the like output from the brake controller 50 are slightly delayed in the timing to transmit to the second CAN bus CAN2, but the vehicle speed does not change abruptly due to the magnitude of the inertia of the vehicle, and there poses no problem.

(Problem Specific to Electric Vehicle)

A description is now given of a problem specific to the electric vehicle. Hitherto, in a vehicle system configured to use wheel speed data to control the powertrain system including an internal combustion engine, the wheel speed data and the torque decrease request are often received from the brake controller 50, and are used. The reason is as follows. Even if control for the internal combustion engine is devised, responsiveness to actually reflect to an output torque is limited, and the responsiveness of the CAN communication line thus rarely poses a problem as a bottleneck in responsiveness required in development of the powertrain. Thus, when the torque decrease request and the wheel speed data are used in the development of the powertrain, the wheel speed detection performance cultivated in the development of the brake system is often directly used for the control. This basic design idea is actually often followed also in the development of the electric vehicle.

On the other hand, on the electric vehicle in which the electric motor 1 is connected to the drive wheels, the responsiveness of the torque control is much better than that of the internal combustion engine, and more precise drive wheel slip control can be carried out. In order to attain control taking advantage of the good responsiveness of the electric motor 1, the responsiveness of the CAN communication line has come to pose a problem. Based on this background, in order to build a system taking advantage of the high responsiveness of the electric motor 1, such a system that the wheel speed data is not received from the brake controller 50 as secondary information, but is received as primary information to calculate a control amount needs to be built.

Moreover, it is important for the vehicle controller 110 configured to control the entire vehicle to monitor and control the entirety, but if such an excessive centralization that, after all information is gathered, all commands are issued to the respective controllers is carried out, a calculation load on the vehicle controller 110 increases, and an extremely expensive controller is necessary. Moreover, the vehicle controller 110 also considers information on a low communication speed, and then outputs a command, and thus, even if an expensive vehicle controller 110 is employed, a vehicle system good in the responsiveness cannot be built. Moreover, it is conceivable to transmit or receive all information quickly, but an increase in a communication speed is a specification change influencing all other controllers connected to this communication line, and it is very difficult to increase the entire communication speed in a complex system.

Thus, according to the first embodiment, the configuration of the CAN communication line is divided into the first CAN bus CAN1 and the second CAN bus CAN2. In addition, such a configuration that the vehicle controller 110 does not output all the commands, but controllers on levels lower than the vehicle controller 110 make determinations and carry out control to some extent is constructed. Specifically, in order to enable determination of a final motor torque command value in the motor controller 100 by priority over the vehicle controller 110, such a configuration that the brake request output from the brake controller 50 can directly be transmitted to the motor controller 100 is provided. Further, such a configuration that the motor controller 100 can read, in addition to the normal torque request from the vehicle controller 110, the brake request from the brake controller 50, and can output the final motor torque command value depending on the travel state is provided.

(Information Transmitted or Received by Controllers)

Figure 4:
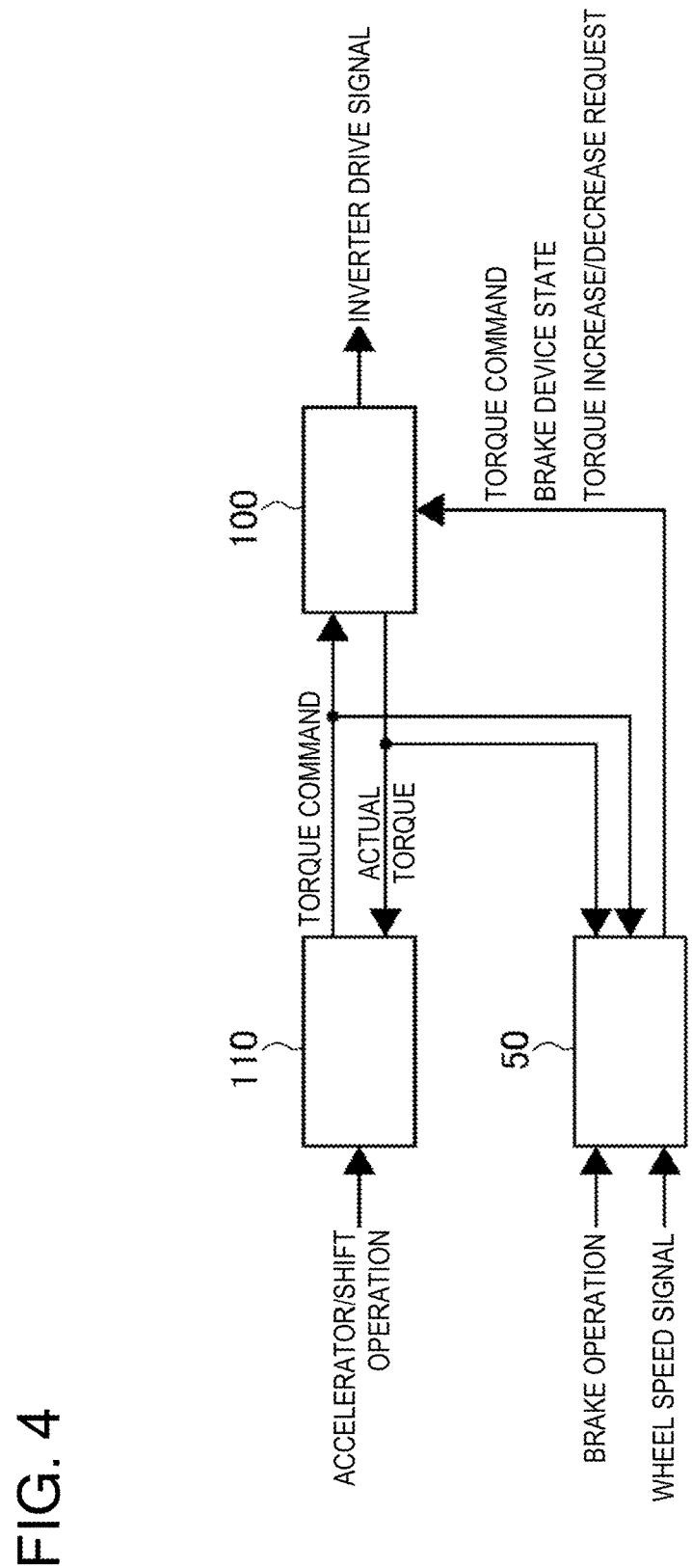
FIG. 4 is a control block diagram for illustrating contents of information to be transmitted or received by the respective controllers according to the first embodiment.

FIG. 4 is a control block diagram for illustrating contents of information to be transmitted or received by the respective controllers according to the first embodiment. The vehicle controller 110 inputs accelerator pedal position information and shift position information, calculates a first torque command value based on a basic driver request torque and other results of control processing, and outputs the first torque command value to the motor controller 100 and the brake controller 50. The brake controller 50 inputs an on/off state of a brake switch representing a brake pedal operation state and a wheel speed signal of each wheel, and outputs, for example, a second torque command value based on a request from a traction control, a brake device state representing whether or not the hydraulic unit 5 and the brake controller 50 are normally operating, and a torque increase/decrease request such as an increase, a decrease, or no increase/decrease in response to a driver request.

In the motor controller 100, when the brake device state is normal, and when a result of a comparison between the first torque command value and the second value command value matches the torque increase/decrease request, the second torque command value from the brake controller 50 is employed, and when these conditions are not satisfied, the first torque command value is employed. As a result of these determinations, even if a problem such as a communication failure occurs, the motor controller 100 is prevented from operating against the intentions of the driver and the brake controller 50.

(Details of Control in Controllers)

Figure 5:
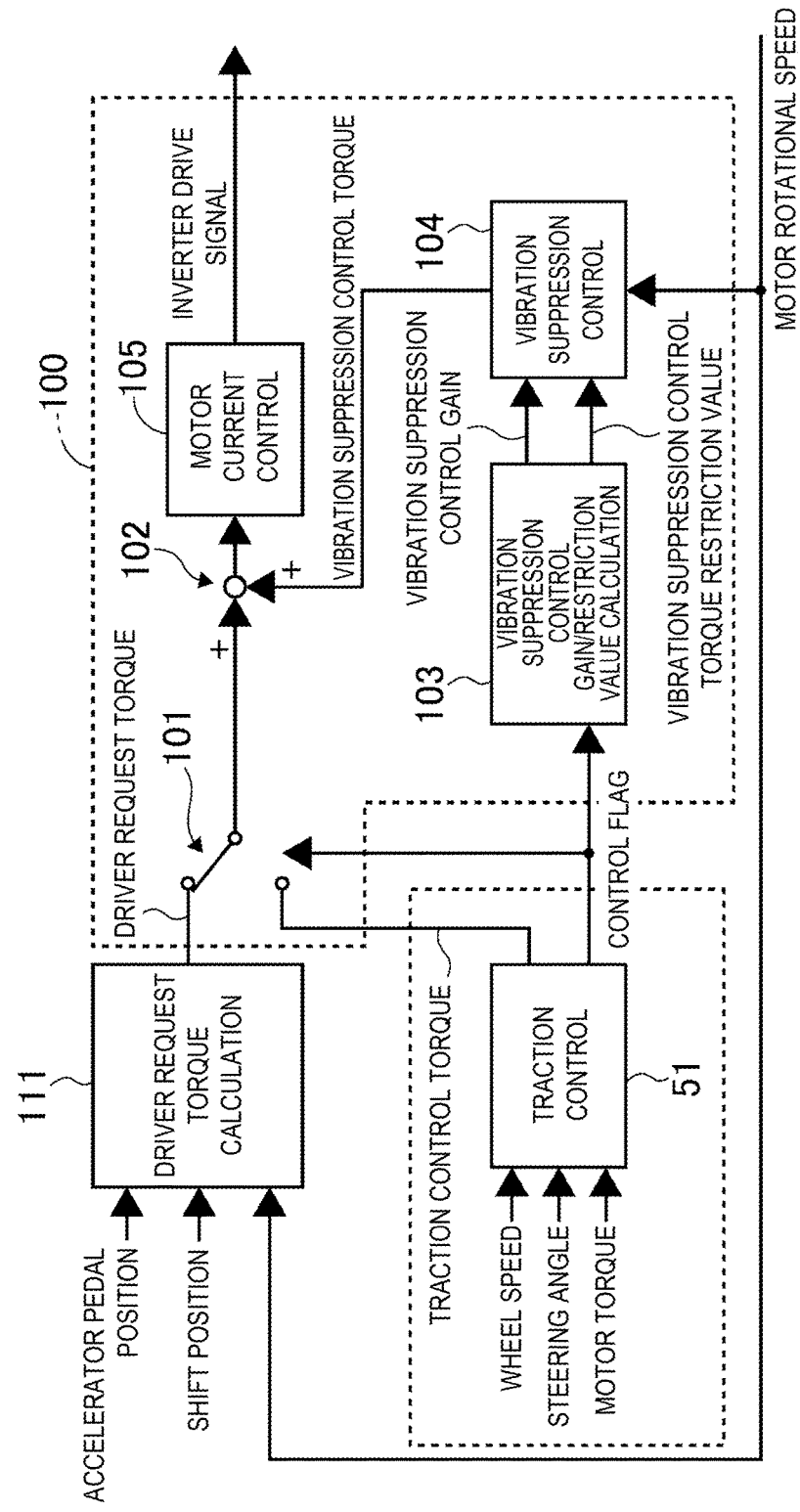
FIG. 5 is a control block diagram for illustrating a request of each of a vehicle controller and a traction control provided in a brake controller, and a control content to be carried out by a motor controller according to the first embodiment.

FIG. 5 is a control block diagram for illustrating a request of each of the vehicle controller and the traction control provided in the brake controller, and a control content to be carried out by the motor controller according to the first embodiment. In FIG. 5, a specialized description is given of the content of the traction control. A driver request torque command value calculation unit 111 in the vehicle controller 110 calculates the driver request torque (first torque command value) based on an accelerator pedal opening degree and a shift position, and outputs the driver request torque to the motor controller 100. A traction control unit 51 in the brake controller 50 inputs the wheel speed information from the wheel speed sensors 9, the steering angle information from the steering angle sensor, and an actual motor torque output by the electric motor 1. Then, the traction control unit 51 determines whether or not the drive wheel is in the drive slip state. When the drive wheel is in the drive slip state, the traction control unit 51 outputs the traction control torque (second torque command value) for suppressing the drive slip, and outputs a control flag representing the control content carried out in the brake controller 50 to the motor controller 100.

The motor controller 100 includes a changeover switch 101 configured to switch, based on the control flag, the command value to be selected between the driver request torque and the traction control torque, a torque addition unit 102 configured to add a vibration suppression control torque to be described later to a switched torque command value TMCIN*, thereby outputting a final torque command value, a motor current control unit 105 configured to output an inverter drive signal to the inverter 10 in order to control the current to be supplied to the electric motor 1 based on the final torque command value, a vibration suppression control information calculation unit 103 configured to calculate a vibration suppression control gain and a vibration suppression control restriction value for suppressing a vibration of a drive system to be generated in the powertrain system, and a vibration suppression control unit 104 configured to calculate, based on the calculated vibration suppression control information and the motor rotational speed, a vibration suppression control torque for suppressing the vibration of the powertrain system.

Figure 6:
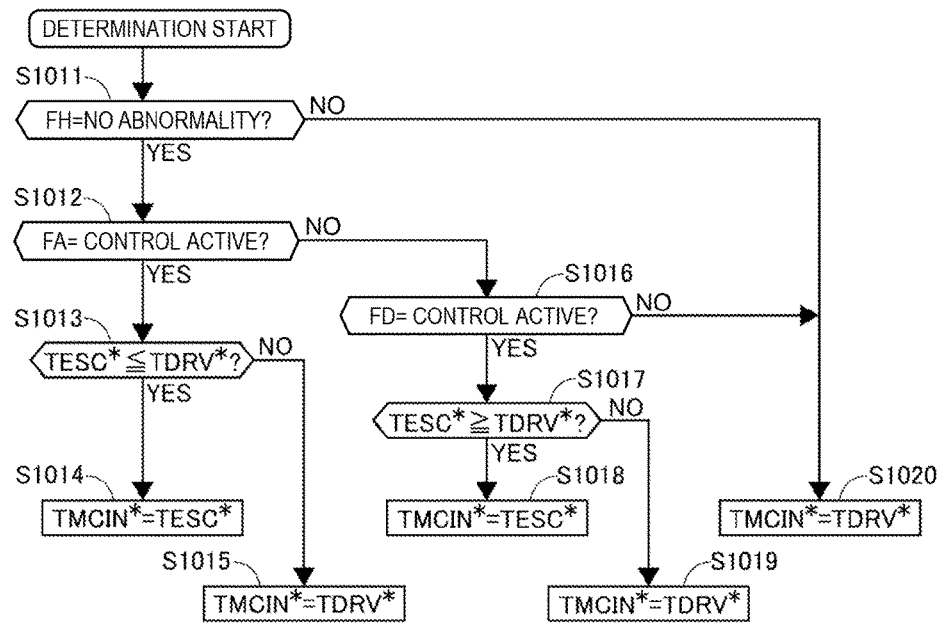
FIG. 6 is a flowchart for illustrating command value selection processing according to the first embodiment.

FIG. 6 is a flowchart for illustrating the command value selection processing according to the first embodiment. In the changeover switch 101, as a result of the following determination processing, any one of a driver request torque command value TDRV* and a slip control torque command value TESC* is output as the torque command value TMCIN*. Note that, in the brake controller 50, an acceleration slip control flag FA and a deceleration slip control flag FD representing a slip control state are provided in the traction control unit 51, and further, an ESC state flag FH representing an abnormal state of the hydraulic unit 5 or the brake controller 50 itself is provided. In Step S1011, it is determined whether or not the ESC state flag FH represents a no abnormality state. When there is no abnormality, the processing proceeds to Step S1012, and, when there is an abnormality, the processing proceeds to Step S1020 so as not to select the command from the brake controller 50, but switch from the torque command value TMCIN* to the driver request torque command value TDRV*.

In Step S1012, it is determined whether or not the acceleration slip control flag FA represents that the control is active. When the control is active, the processing proceeds to Step S1013, and when the control is inactive, the processing proceeds to Step S1016. In Step S1013, it is determined whether or not the slip control torque command value TESC* is equal to or less than the driver request torque command value TDRV*. When the slip control torque command value TESC* is equal to or less than the driver request torque command value TDRV*, the processing proceeds to Step S1014 so as to switch from the torque command value TMCIN* to the slip control torque command value TESC*. In other words, during the acceleration slip control, the torque decrease should be applied to the driver request torque command value TDRV*, and when the slip control torque command value TESC* is equal to or less than the driver request torque command value TDRV*, the lower torque needs to be selected to suppress the slip. On the other hand, even during the acceleration slip control, when the slip control torque command value TESC* is more than the driver request torque command value TDRV*, the acceleration slip tends to be promoted, and, in this case, the processing proceeds to Step S1015 so as to switch from the torque command value TMCIN* to the driver request torque command value TDRV*.

In Step S1016, it is determined whether or not the deceleration slip control flag FD represents that the control is active. When the control is active, the processing proceeds to Step S1017, and when the control is inactive, the processing proceeds to Step S1020. In Step S1017, it is determined whether or not the slip control torque command value TESC* is equal to or more than the driver request torque command value TDRV*. When the slip control torque command value TESC* is equal to or more than the driver request torque command value TDRV*, the processing proceeds to Step S1018 so as to switch from the torque command value TMCIN* to the slip control torque command value TESC*. In other words, during the deceleration slip control, as a result of generation of a regenerative torque as the driver request torque command value TDRV*, a slip is generated, and when, in order to increase the torque to eliminate this slip, the slip control torque command value TESC* is equal to or more than the driver request torque command value TDRV*, appropriate control is considered to be carried out. On the other hand, even during the deceleration slip control, when the slip control torque command value TESC* is less than the driver request torque command value TDRV*, the deceleration slip tends to be promoted, and, in this case, the processing proceeds to Step S1019 so as to switch from the torque command value TMCIN* to the driver request torque command value TDRV*.

Figure 7:
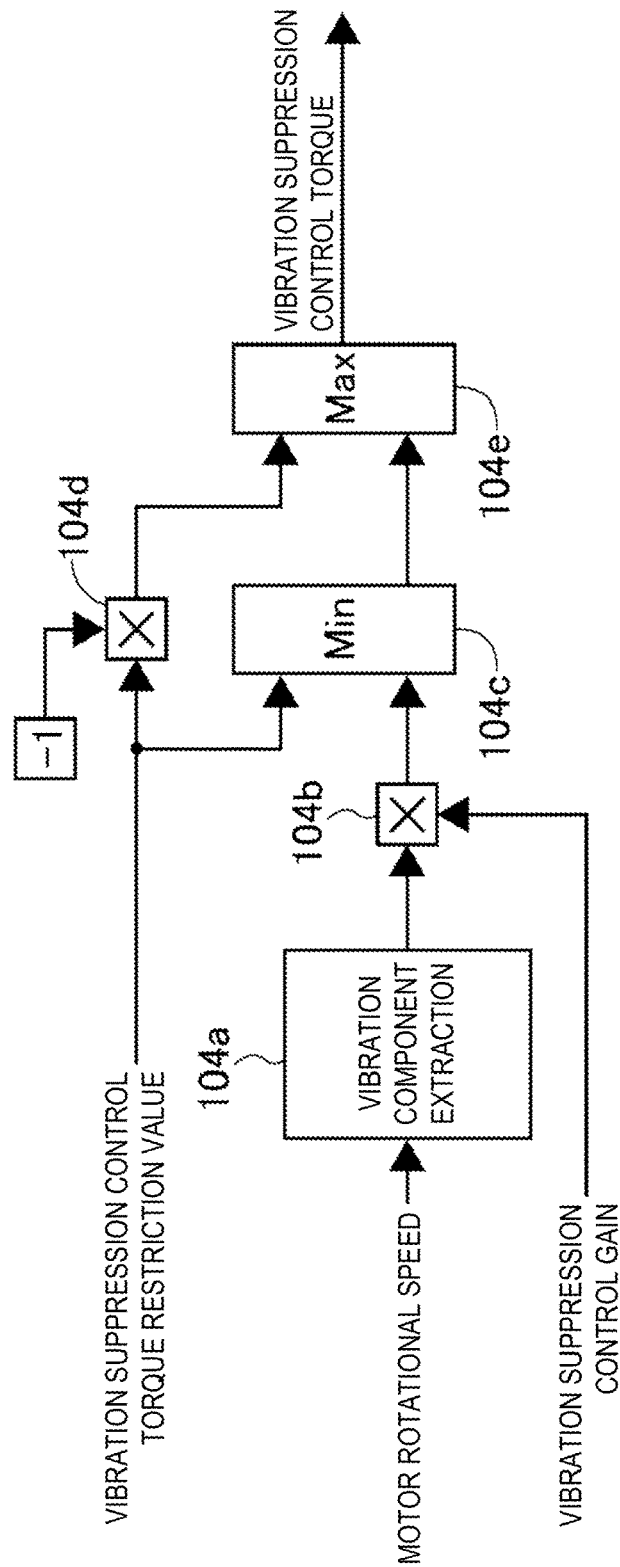
FIG. 7 is a control block diagram for illustrating vibration suppression control torque command value calculation processing according to the first embodiment.

FIG. 7 is a control block diagram for illustrating vibration suppression control torque command value calculation processing according to the first embodiment. The vibration suppression control unit 104 includes a vibration component extraction unit 104a configured to extract a vibration component from the motor rotational speed. The vibration component extraction unit 104a is constructed by a high-pass filter, and passes only a predetermined high-frequency component. A gain multiplication unit 104b multiplies the vibration component that has passed through the high-pass filter by a vibration control gain. A torque restriction unit 104c compares magnitudes of the vibration suppression control torque restriction value and the vibration suppression control torque after the gain multiplication with each other, and selects a smaller one. A negative value multiplication unit 104d multiplies the vibration suppression control torque restriction value by a negative value. A torque restriction unit 104e compares magnitudes of a negative value of the vibration suppression control torque restriction value and the vibration suppression control torque selected by the torque restriction unit 104c, with each other, and selects a larger one. As a result, the vibration suppression control torque corresponding to the vibration component is calculated, and generation of an excessive vibration suppression control torque is suppressed.

(Slip Control)

Figure 8:
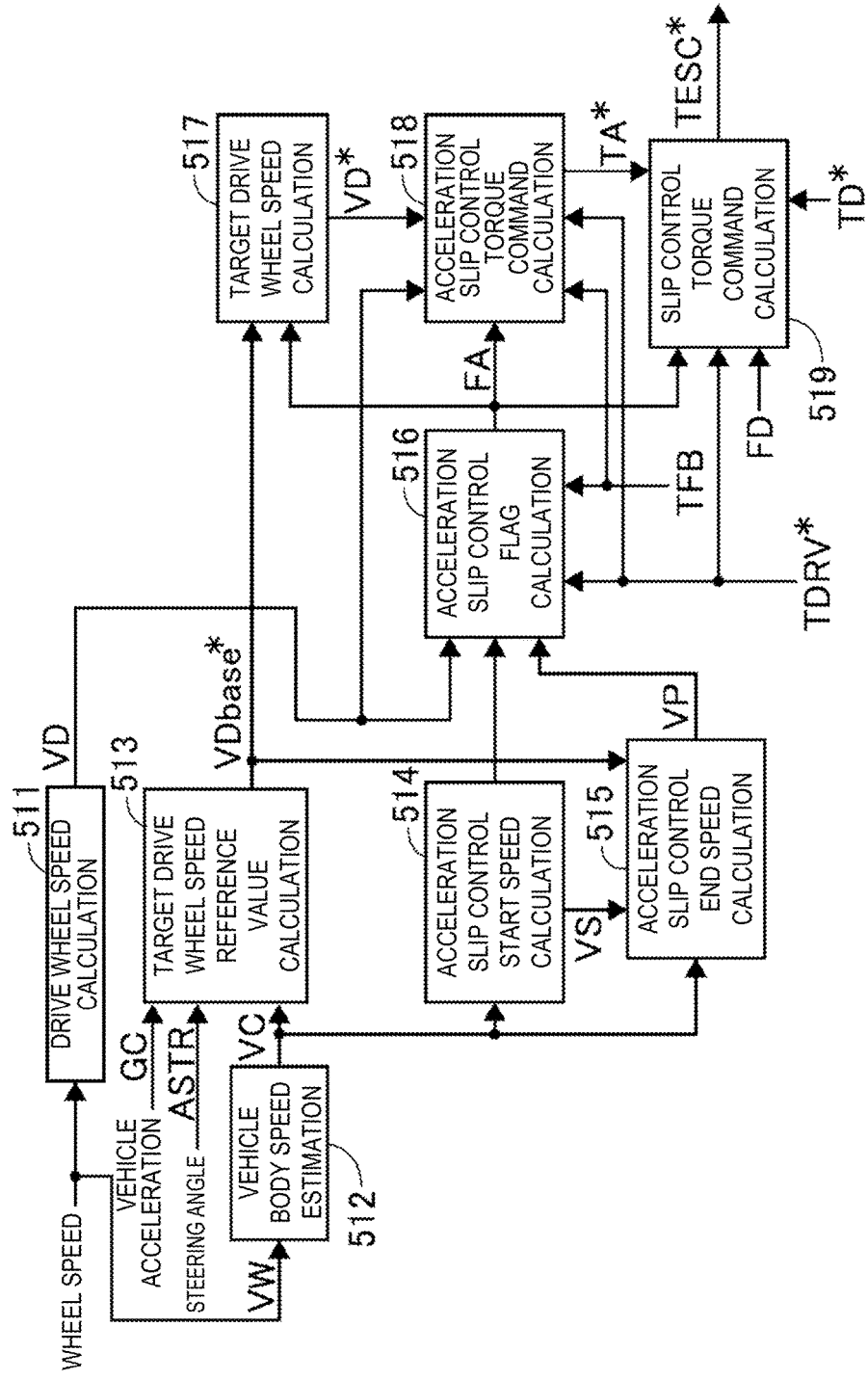
FIG. 8 is a control block diagram for illustrating slip control to be carried out by a traction control unit according to the first embodiment.

FIG. 8 is a control block diagram for illustrating slip control to be carried out by the traction control unit according to the first embodiment. A drive wheel speed calculation unit 511 calculates a drive wheel speed VD based on detected wheel speeds VW. A vehicle body speed estimation unit 512 calculates an estimated vehicle body speed VC based on the wheel speeds VW. For example, the vehicle body speed may be estimated based on an average of vehicle body speeds calculated from the wheel speeds of the respective driven wheels, may be an average of vehicle body speeds calculated from the wheel speeds of the respective four wheels, or may be the select-low of the driven wheels and drive wheels (acquiring the vehicle body speed by selecting a lower one of the wheel speeds of the driven wheels and the drive wheels), and thus there is no particular limitation. Moreover, the traction control unit includes a vehicle body acceleration detection unit configured to detect a vehicle body acceleration GC. This detection unit may be a G sensor configured to detect a longitudinal acceleration, or may use a derivative of the estimated vehicle body speed VC as the vehicle body acceleration GC, and is thus not particularly limited.

(Target Drive Wheel Speed Reference Value Calculation Processing)

Figure 9:
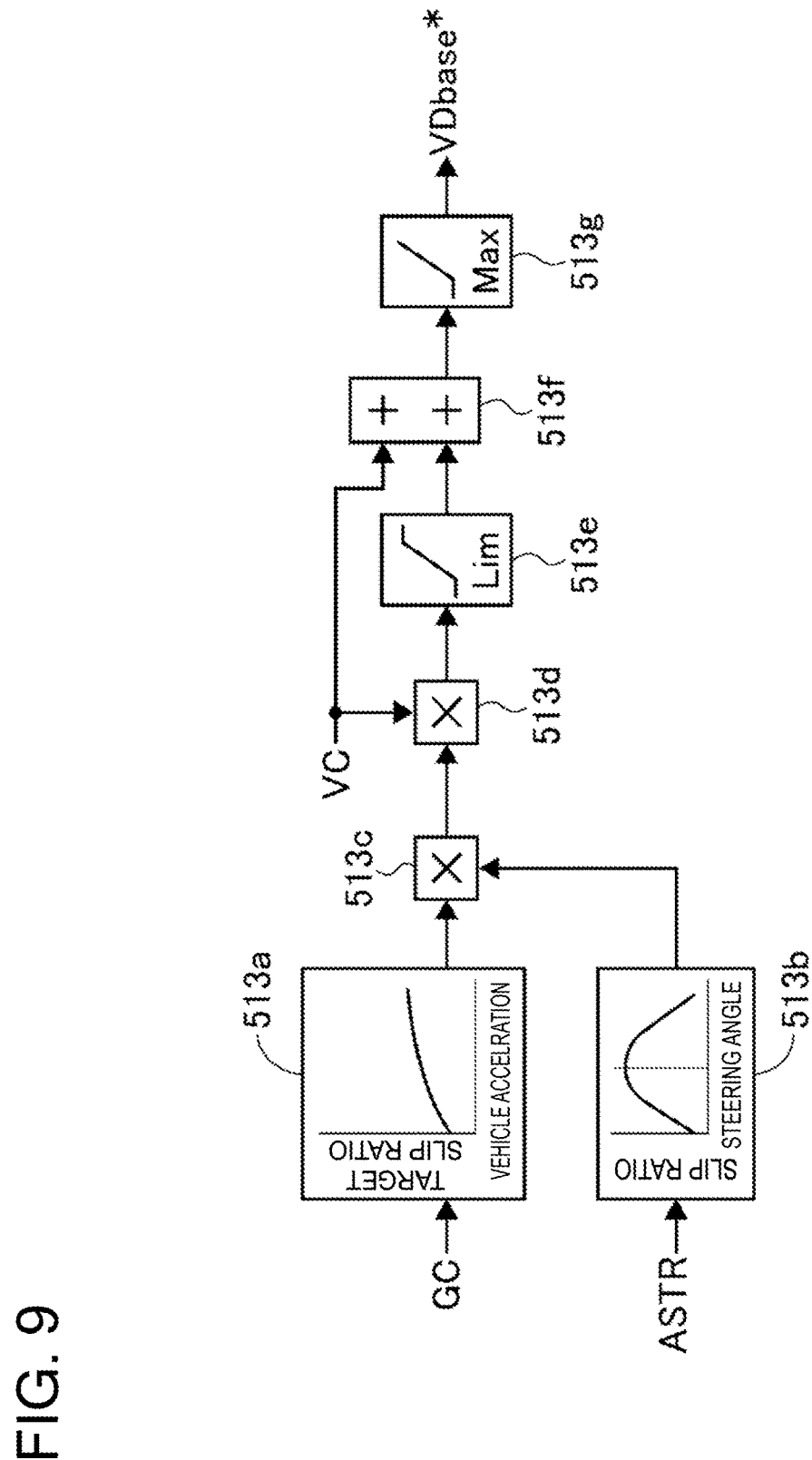
FIG. 9 is a control block diagram for illustrating target drive wheel speed reference value calculation processing according to the first embodiment.

A target drive wheel speed reference value calculation unit 513 calculates a target drive wheel speed reference value VDbase*, which is a target speed of each of the drive wheels, based on the vehicle body acceleration GC, a steering angle Astr, and the estimated vehicle body speed VC. FIG. 9 is a control block diagram for illustrating target drive wheel speed reference value calculation processing according to the first embodiment. An acceleration target slip ratio gain calculation unit 513a includes an acceleration target slip ratio gain map, and is set so as to calculate a larger acceleration target slip ratio gain as the detected acceleration GC increases. In other words, when a large acceleration is acquired, a friction force between the drive wheel and the road surface is considered to be secured even when a certain slip ratio is permitted. A steering angle target slip ratio gain calculation unit 513b includes a steering angle target slip ratio gain map, and is configured to calculate a larger steering angle target slip ratio gain when the detected steering angle is close to a neutral position, and calculate a smaller steering angle target slip ratio gain as the steering angle represents a larger steering state. In other words, in a straight travel state, less cornering force is necessary, and hence a large force is used in a longitudinal direction of a friction circle of the tire, while, in a steering state, a cornering force is necessary, and hence less force is used in the longitudinal direction of the friction circle of the tire and a force in a lateral direction is secured.

A slip ratio calculation unit 513c multiples the acceleration target slip ratio gain and the steering angle target slip ratio gain by each other, thereby calculating a target slip ratio reflecting both the states. A target slip amount calculation unit 513d multiples the calculated target slip ratio by the estimated vehicle body speed VC so as to calculate a target slip amount. A limiter processing unit 513e applies limit processing to the target slip amount so as to suppress an abrupt change in the target value. An addition unit 513f adds the target slip amount to the estimated vehicle body speed VC, thereby calculating a target drive wheel speed VD*. A limiter processing unit 513g applies limiter processing to the target drive wheel speed VD*, thereby calculating the target drive wheel speed reference value VDbase*. Note that, when a yaw rate sensor is provided, the following control may be carried out. That is, a yaw rate sensor value and an estimated yaw rate calculated from the steering angle and the estimated vehicle body speed VC may be compared with each other, and when a difference therebetween is large, the target slip ratio and the torque command value may be corrected to suppress the difference between the yaw rate sensor value and the estimated yaw rate.

(Acceleration Slip Control Start Speed Calculation Processing)

Figure 13:
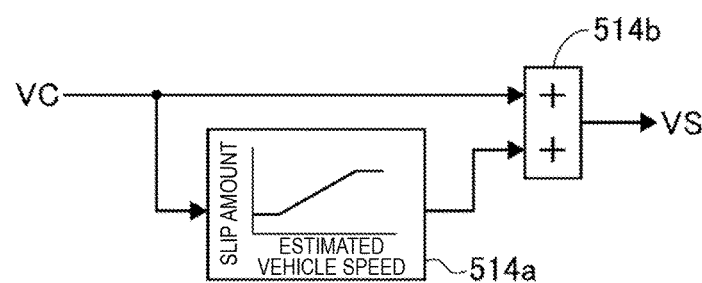
FIG. 13 is a control block diagram for illustrating acceleration slip control start speed calculation processing according to the first embodiment.

An acceleration slip control start speed calculation unit 514 calculates a control start speed VS based on the estimated vehicle body speed VC. FIG. 13 is a control block diagram for illustrating acceleration slip control start speed calculation processing according to the first embodiment. In a control start slip amount map 514a, as the estimated vehicle body speed VC increases, a larger slip amount is calculated. This is because, in terms of the slip ratio, a control start slip ratio is set to be approximately constant. Note that, in a low vehicle speed state including a start state, the calculation of the slip ratio is difficult, and the map 514a sets a constant slip amount. Then, an addition unit 514b adds the slip amount calculated from the control start slip amount map 514a to the estimated vehicle body speed VC, thereby calculating the control start speed VS.

(Acceleration Slip Control End Speed Calculation Processing)

Figure 14:
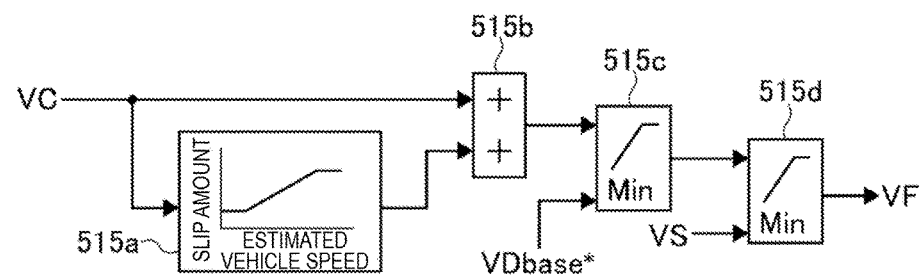
FIG. 14 is a control block diagram for illustrating acceleration slip control end speed calculation processing according to the first embodiment.

An acceleration slip control end speed calculation unit 515 calculates a control end speed VF based on the estimated vehicle body speed VC. FIG. 14 is a control block diagram for illustrating acceleration slip control end speed calculation processing according to the first embodiment. In a control end slip amount map 515a, as the estimated vehicle body speed VC increases, a larger slip amount is calculated. Note that, when the control end speed VF is set, in terms of avoidance of a control hunting, for the same estimated vehicle body speed VC, the slip amount set in the control end slip amount map 515a is set smaller than the slip amount set in the control start slip amount map 514a. Then, an addition unit 515b adds the slip amount calculated from the control end slip amount map 515a to the estimated vehicle body speed VC, thereby calculating a control end speed calculation value. Then, a first selection unit 515c selects smaller one of the control end speed calculation value and the target drive wheel speed reference value VDbase* so that the control end speed VF is set closer to the estimated vehicle body speed VC than to the target drive wheel speed reference value VDbase*, thereby preventing the hunting. Similarly, a second selection unit 515d selects smaller one of the selected value in the first selection unit 515c and the control start speed VS so that the control end speed VF is set closer to the estimated vehicle body speed VC than to the control start speed VS, thereby preventing the hunting. Then, the finally selected value is output as the control end speed VF.

(Acceleration Slip Control Flag Calculation Processing)

Figure 15:
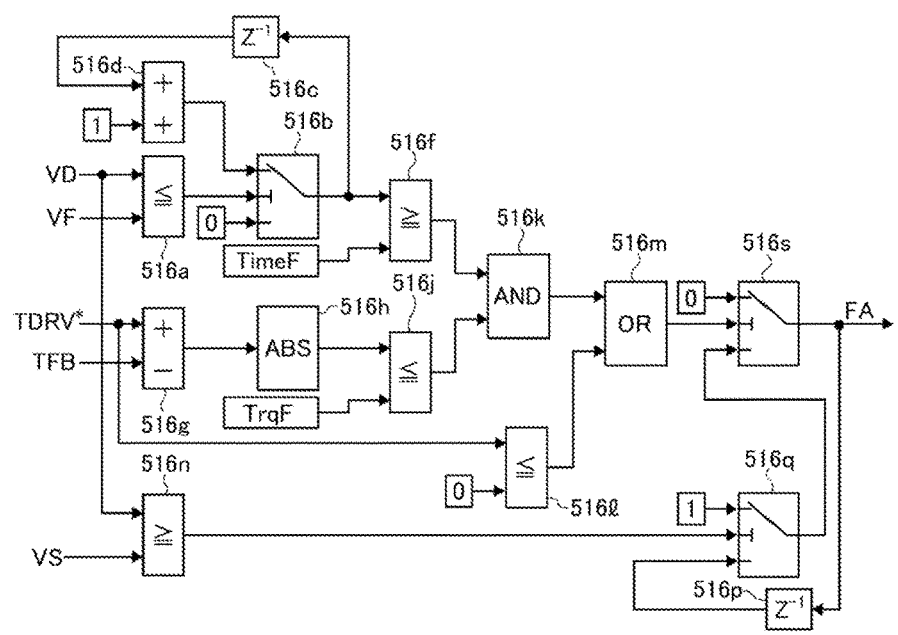
FIG. 15 is a control block diagram for illustrating acceleration slip control flag calculation processing according to the first embodiment.

An acceleration slip control flag calculation unit 516 determines, based on the state of the drive wheels, whether or not to carry out acceleration slip control. When the acceleration slip control is carried out, the acceleration slip control flag calculation unit 516 outputs the acceleration slip control flag FA set to ON, and, when the acceleration slip control is not carried out, the acceleration slip control flag calculation unit 516 outputs the acceleration slip control flag FA set to OFF. FIG. 15 is a control block diagram for illustrating acceleration slip control flag calculation processing according to the first embodiment. Note that, FIG. 15 is a diagram for illustrating a case in which a shift lever is at a D range, but basically the same processing is carried out for other shift ranges.

A control end determination unit 516a compares the drive wheel speed VD and the control end speed VF with each other, and, when the drive wheel speed VD is equal to or less than the control end speed VF, outputs a switch signal to an end side first switch 516b. The end side first switch 516b is a switch configured to switch between 0 and a counter value constructed by a previous value output unit 516c and a count-up unit 516d. When the switch signal is received from the control end determination unit 516a in a state in which 0 is selected during the drive slip control, the end side first switch 516b starts count up through the previous value output unit 516c and the count-up unit 516d, and outputs a count to a control end delay determination unit 516f. When the value output from the end side first switch 516b is equal to or more than a timer value TimeF set in advance, the control end delay determination unit 516f outputs a signal representing a state in which one of control end conditions is satisfied to an AND condition determination unit 516k. In other words, the control end delay determination unit 516f determines whether or not a period equal to or longer than TimeF has elapsed after the drive wheel speed VD becomes equal to or less than the control end speed VF, and when the period has elapsed, the control end delay determination unit 516f outputs the signal representing the state in which one of control end conditions is satisfied.

A torque deviation calculation unit 516g calculates a torque deviation between the driver request torque command value TDRV* and a final torque command value TFB directed to the electric motor 1, and outputs an absolute value thereof acquired by an absolute value processing unit 516h to a torque state determination unit 516j. When the torque deviation is equal to or less than a predetermined torque value TrqF set in advance, the torque state determination unit 516j outputs a signal representing a state in which one of the control end conditions is satisfied.

When the condition for the end determination and the delay processing based on the drive wheel speed VD is satisfied, and when such a condition that the driver request torque command value TDRV* approximately matches the torque instructed to the electric motor 1 is satisfied, the AND condition determination unit 516k outputs a control end condition satisfaction signal to an OR condition determination unit 516m. Moreover, when the driver request torque command value TRDV* is equal to or less than 0, a negative value determination unit 516l outputs a control end condition satisfaction signal. When any one of the AND condition determination unit 516k and the negative value determination unit 516l outputs the control end condition satisfaction signal, the OR condition determination unit 516m outputs a switch signal to a control flag switch 516s.

A control start determination unit 516n compares the drive wheel speed VD and the control start speed VS with each other, and, when the drive wheel speed VD is equal to or more than the control start speed VS, outputs a switch signal to a start side switch 516q, thereby outputting 1. Upon the control start determination, the slip of the drive wheel is increasing, and the control thus needs to be quickly started. Thus, the slip control is quickly started without a delay period or the like. When a signal of a control flag previous value output unit 516p, which is the previous value of the control flag switch 516s, is input to the start side switch 516q, and the start side switch 516q outputs 1 due to the switch signal from the control start determination unit 516n, if the condition becomes no longer satisfied in the control start determination unit 516n, the start side switch 516q switches from 1 to the control flag previous value. On this occasion, when the control end condition satisfaction signal is not output from the OR condition determination unit 516m, 1 is continuously output from the control flag switch 516s, and the control flag thus is in the ON state.

(Target Drive Wheel Speed Calculation Processing)

Figure 10:
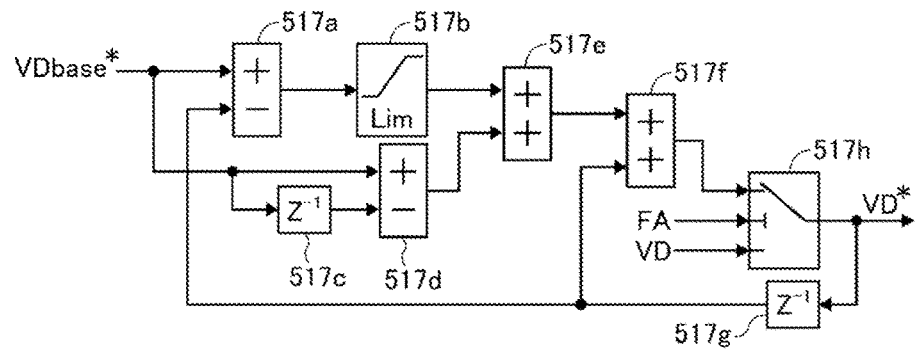
FIG. 10 is a control block diagram for illustrating target drive wheel speed calculation processing according to the first embodiment.

A target drive wheel speed calculation unit 517 calculates a target drive wheel speed VD* based on the target drive wheel speed reference value VDbase*. FIG. 10 is a control block diagram for illustrating target drive wheel speed calculation processing according to the first embodiment. Note that, in a state before the start of the slip control, the drive wheel speed VD is set as an initial value of the target drive wheel speed VD*. A target value deviation calculation unit 517a calculates a target value deviation between the target drive wheel speed reference value VDbase* and a previous target drive wheel speed VD* calculated by a target drive wheel speed previous value calculation unit 517g. A limiter 517b carries out limit processing for imposing a restriction on the deviation in order to attain a smooth torque change, and outputs the processed deviation to a first addition unit 517e. Moreover, a change amount calculation unit 517d calculates a change amount from a difference between a previous target drive wheel speed reference value VDbase*, which is output from a previous value output unit 517c configured to output a previous value of the target drive wheel speed reference value VDbase*, and a current target drive wheel speed reference value VDbase*, and outputs the change amount to the first addition unit 517e.

The first addition unit 517e adds the target value deviation and the change amount of the target drive wheel speed reference value VDbase* to each other, thereby calculating a change amount of the drive wheel speed to be changed in the control for this time. As a result, after the slip control starts, even when the target drive wheel speed reference value VDbase* makes a change exceeding the limit of the limiter 517b, the target drive wheel speed VD* can follow the target drive wheel speed reference value VDbase*. A second addition unit 517f adds the value output from the first addition unit 517e to the previous target drive wheel speed VD*, thereby calculating a primary target drive wheel speed, and outputs the primary target drive wheel speed to a target drive wheel speed changeover switch 517h. When the acceleration slip control flag FA is 0, the target drive wheel speed changeover switch 517h outputs the drive wheel speed VD as a final target drive wheel speed VD*, and, when the acceleration slip control flag FA is 1, outputs the primary target drive wheel speed as the final target drive wheel speed VD*.

(Acceleration Slip Control Torque Command Value Calculation Processing)

Figure 11:
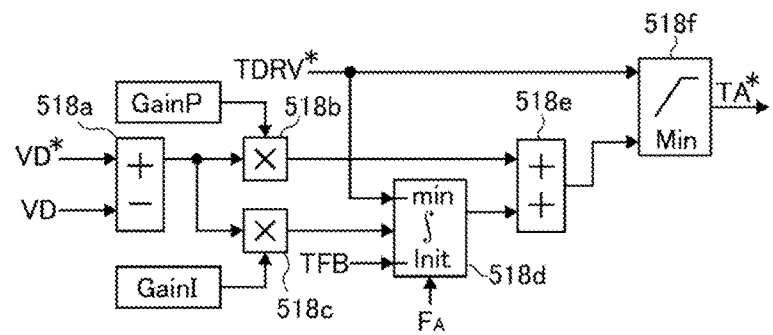
FIG. 11 is a control block diagram for illustrating acceleration slip control torque calculation processing according to the first embodiment.

An acceleration slip control torque command value calculation unit 518 calculates an acceleration slip control torque command value based on a deviation between the drive wheel speed VD and the target drive wheel speed VD*. FIG. 11 is a control block diagram for illustrating acceleration slip control torque calculation processing according to the first embodiment. A speed deviation calculation unit 518a calculates a speed deviation between the target drive wheel speed VD* and the drive wheel speed VD. A proportional gain multiplication unit 518b multiplies the speed deviation by a proportional gain Kp, thereby outputting a proportional component. An integral gain multiplication unit 518c multiples the speed deviation by an integral gain Ki. An integration unit 518d outputs, as an integral component, smaller one of an integral using the final torque command value TFB as an initial value and the driver request torque command value TDRV*. A PI control amount calculation unit 518e adds the proportional component and the integral component to each other, thereby outputting a PI control torque command value. An acceleration slip control torque command determination unit 518f outputs, as a final acceleration slip control torque command value TA*, smaller one of the driver request torque command value TDRV* and the PI control torque command value. Note that, an initial value of the target drive wheel speed VD* is the drive wheel speed VD, and hence the proportional component is zero, and the integral component is also set to the final torque command value TFB. The deviation is thus not generated immediately after the control start, and hence a torque fluctuation is not caused.

(Slip Control Torque Command Value Calculation Processing)

Figure 12:
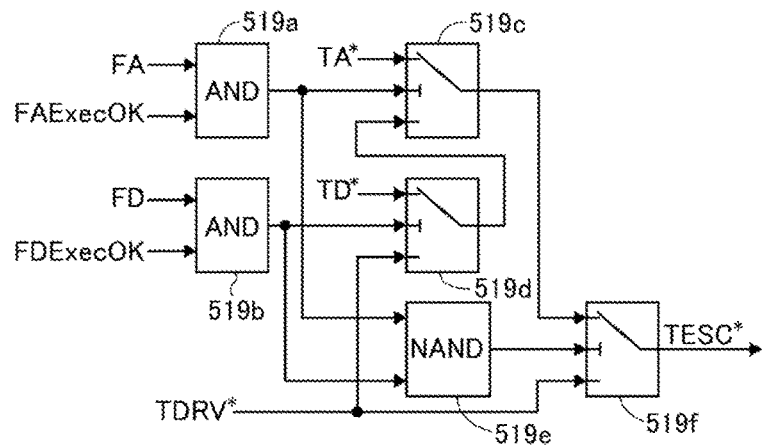
FIG. 12 is a control block diagram for illustrating slip control torque command value calculation processing according to the first embodiment.

A slip control torque command value calculation unit 519 selects, based on signals such as the acceleration slip control flag FA and the deceleration slip control flag FD, any one of the slip control torque command value TA* and the driver request torque command value TDRV*, thereby outputting a final slip control torque command value TESC*. FIG. 12 is a control block diagram for illustrating slip control torque command value calculation processing according to the first embodiment. An acceleration slip control execution permission flag FAExecOK and a deceleration slip control execution permission flag FDExecOK are respectively execution permission flags for the slip control. In a regeneration inhibition state, when a slip control off switch is depressed, or when a certain abnormality (such as a wheel speed sensor abnormality) is detected, the slip control is inhibited, and otherwise is permitted. When both the acceleration slip control flag FA and the acceleration slip control execution permission flag FAExecOK satisfy the conditions, an acceleration side AND determination unit 519a outputs a switch signal to an acceleration slip control torque command value changeover switch 519c and a NAND determination unit 519e. Similarly, when both the deceleration slip control flag FD and the deceleration slip control execution permission flag FDExecOK satisfy the conditions, a deceleration side AND determination unit 519b outputs a switch signal to a deceleration slip control torque command value changeover switch 519d and the NAND determination unit 519e. Note that, the NAND determination unit 519e is configured to determine, when the acceleration slip control flag FA and the deceleration slip control flag FD are simultaneously satisfied, that there is an abnormality, to thereby carry out processing so as not to follow the slip control request but to output the driver request torque command value TDRV*.

When the acceleration slip control request is output from the acceleration side AND determination unit 519a, a first torque command value changeover switch 519c switches the signal (TD* or TDRV*), which is output from the deceleration slip control torque command value changeover switch 519d, to the acceleration slip control torque command value TA*, thereby outputting the acceleration slip control torque command value TA* to a slip control torque command value calculation unit 519f. When the acceleration slip control request is not output, the first torque command value changeover switch 519c outputs the signal output from the second torque command value changeover switch 519d. When the deceleration slip control request is output from the deceleration side AND determination unit 519b, the second torque command value changeover switch 519d switches from the driver request torque command value TDRV* to the deceleration slip control torque command value TD*, thereby outputting the deceleration slip control torque command value TD* to the first torque command value changeover switch 519c, and when the deceleration slip control request is not output, the second torque command value changeover switch 519d outputs the driver request torque command value TDRV* to the first torque command value changeover switch 519c. When the NAND determination unit 519e makes the abnormality determination, the slip control torque command value calculation unit 519f outputs the driver request torque command value TDRV* as the slip control torque command value TESC*, and when the abnormality determination is not made, the slip control torque command value calculation unit 519f outputs the signal output from the first torque command value changeover switch 519c, as the slip control torque command value TESC*.

(Effect Acquired by Slip Control Improved in Responsiveness)

Figure 16:
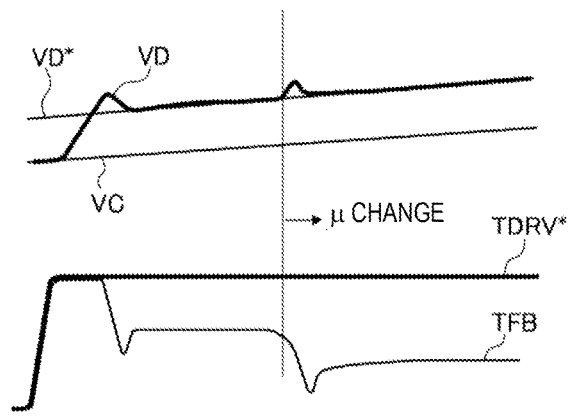
FIG. 16 are time charts for illustrating a relationship between the number of rotations and a torque when drive slip control is carried out.
Figure 16:
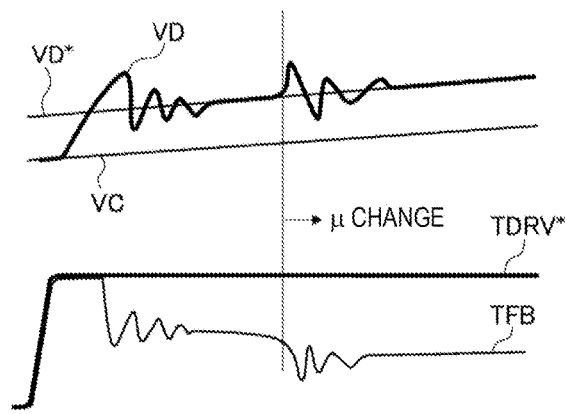
Figure 16:
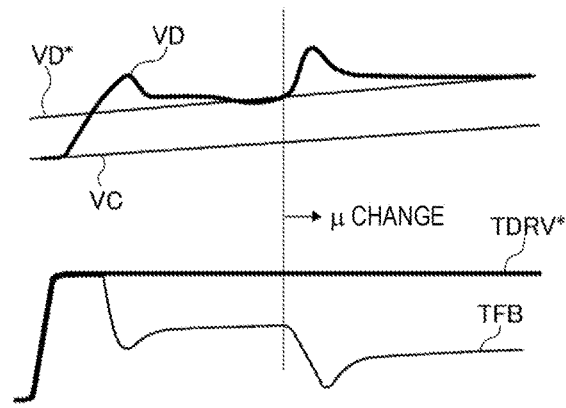

A description is now given of an effect in the slip control acquired by the above-mentioned control configuration. FIG. 16 are time charts for illustrating a relationship between the number of rotations and a torque when the drive slip control is carried out. FIG. 16(a) is a time chart when the configuration of the first embodiment is employed, FIG. 16(b) is a time chart when the configuration of the comparative example of FIG. 3 is employed, and when the control gain is set high, and FIG. 16(c) is a time chart when the configuration of the comparative example of FIG. 3 is employed, and when the control gain is set low. As illustrated in FIG. 16(a), when the drive slip is generated while the driver request torque command value TDRV* is output, the acceleration slip control flag FA is set to 1, and the acceleration slip control torque command value TA* is output so that the drive wheel speed VD converges to the target drive wheel speed VD*. On this occasion, by the configuration of the first embodiment, the acceleration slip control torque command value TA* is directly output from the traction control unit 51 of the brake controller 50 to the motor controller 100 without passing through the vehicle controller 110, and it is understood that the drive wheel speed VD appropriately converges to the target drive wheel speed VD* without a response delay. Moreover, even when such a µ change that the road surface suddenly becomes a frozen road during the travel and the road surface friction coefficient rapidly decreases occurs, the traction control extremely high in the convergence is also realized by the good responsiveness, and it is considered that such a point that the cornering force can be secured due to the good convergence is a fact to be particularly mentioned.

In contrast, in the comparative example of FIG. 16(b), even if the traction control is started after the drive wheel speed VD exceeds the target drive wheel speed VD*, a large overshoot is generated by the response delay. Further, even when the motor torque is decreased in order to converge the overshoot in the number of rotations, the traction control presents an oscillational behavior, and a period is required until the convergence. Moreover, when the µ change occurs, the traction control also presents an oscillational behavior, resulting in a bad convergence. As a solution to the problem of FIG. 16(b), as illustrated in FIG. 16(c), it is conceivable to set the control gain low, thereby suppressing the oscillational behavior. In this case, the oscillational behavior of the control is suppressed, but the period until the drive wheel speed VD converges to the target drive wheel speed VD* is long. During this period, the state in which the slip amount is large continues, and hence a sufficient traction cannot be transmitted between the tire and the road surface. Further, the cornering force also tends to decrease, and a vehicle stability cannot be said to be sufficient. In other words, the extremely large difference in the convergence is generated by the direct command to the motor controller 100 as in the first embodiment. When the vehicle according to the first embodiment actually travels on a frozen road or the like, this effect can provide stability that exceeds stability imagined by desk study, and that a driver has never experienced before.

(Problem Relating to µ Jump During Slip Control)

Figure 17:
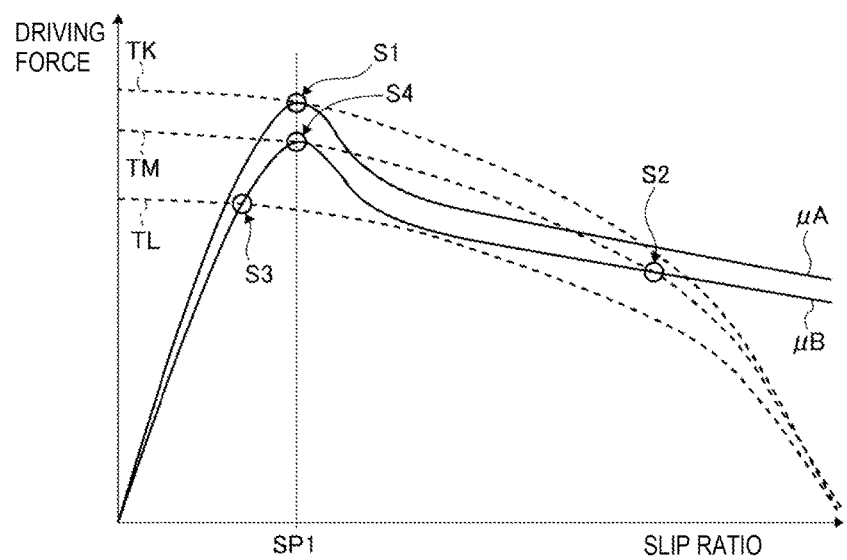
FIG. 17 is a characteristic chart for illustrating a relationship between a slip ratio and a driving force when slip control is carried out in a comparative example.

A description is now given of a problem relating to a µ jump during the slip control when the above-mentioned slip control is carried out. The µ jump means a sudden change in a road surface friction coefficient, and represents, for example, a case in which a compacted snow road changes to a frozen road, and the road surface friction coefficient thus suddenly decreases. A description is now given of a problem relating to the µ jump while using a comparative example in which a slip ratio at which the maximum driving force can be obtained when the slip control is carried out is set to a target slip ratio. FIG. 17 is a characteristic chart for illustrating a relationship between the slip ratio and the driving force when the slip control is carried out in the comparative example. In this characteristic chart, the slip ratio is set to a horizontal axis, and the driving force is set to a vertical axis. The solid lines in FIG. 17 represent driving forces generated between the drive wheel and the road surface. The driving force is determined by a normal force and the friction coefficient. In other words, the driving force represents a friction coefficient µ of the road surface (hereinafter also described as μ-s characteristic). In this μ-s characteristic, in general, the driving force increases as the slip ratio increases until a slip ratio SP1 that corresponds to the maximum braking friction coefficient (driving force decreases as the slip ratio decreases), and gradually decreases while presenting a downward convex tendency after the slip ratio SP1. When the road surface friction coefficient changes, the slip ratio corresponding to the maximum braking friction coefficient hardly changes, and the characteristic presents such a change that the friction coefficient shifts downward.

Moreover, the dotted lines in FIG. 17 respectively represent driving force components when certain motor torque command values are output to the electric motor 2. When the motor torque command value is output to the electric motor 2, the component output from the electric motor 2 based on the motor torque command value is divided into a driving force component transmitted to the road surface and an idling component that causes the drive wheel to idle. A characteristic represented by the dotted lines in FIG. 17 represents a state in which when the slip ratio increases, the driving force component decreases due to the increase of the idling component.

When a drive slip is generated during a travel on a road surface having a road surface friction coefficient of μA, a target slip ratio is set to the slip ratio SP1 corresponding to the peak of μA, and hence when TK is output as the motor torque command value, the target slip ratio positions at the point S1, and this motor torque command value TK and the μ-s characteristic constitute a balanced state. On this occasion, the slip control is not carried out, and this is a state of a travel at the highest friction coefficient in the balanced state. In this state, when a μ jump occurs, and the road surface friction coefficient changes to μB, the μ-s characteristic moves downward. Thus, in the state in which the motor torque command value TK is output, the driving force at the point S1 cannot be received. Thus, the slip ratio increases, and the slip control is started. On this occasion, the motor torque command value achieving a point S4 balancing with the target slip ratio at the decreased road surface friction coefficient μB is TM, and the torque is decreased from TK to TM.

However, even when the torque is decreased, the state has once entered into the slip state and the slip ratio has increased. The motor torque command value TM and the μ-s characteristic of the road surface friction coefficient μB thus balance with each other at a point S2 at which the slip ratio is considerably increased. At this point, the driving force is not acquired, and the slip ratio is large. Therefore, such control that the slip ratio once decreases below the target slip ratio SP1 needs to be provided. As the motor torque command value, a motor torque command value achieving a point S3 that balances with the road surface friction coefficient μB only at a slip ratio lower than the slip ratio SP1 is TL. Thus, when the slip control is started at the motor torque command value TK, the torque is once decreased to TL, and is then increased to TM balancing with the maximum braking friction coefficient for the road surface friction coefficient μB. Therefore, a change in a longitudinal acceleration caused by the generation of the large torque decrease leads to a sense of discomfort, and the large change in the slip ratio generates a fluctuation of a cornering force, which does not allow to sufficiently secure stability of the vehicle. Moreover, when a μ jump occurs only on one of the drive wheels such as the right wheel, the left and right wheels are driven via the differential gear 3, and hence the increase in the slip ratio of the right wheel increases the number of rotations of the right wheel to decrease the driving force. The driving force of the left wheel decreases as a result of the decrease in the driving force of the right wheel, and the driving forces cannot thus be secured as a whole. Moreover, a friction in the differential gear 3 caused by the differential rotation between the left and right wheels generates a left/right driving force difference, and an unintended moment may thus be generated.

In other words, when the slip ratio SP1 providing the maximum braking force friction coefficient is set as the target slip ratio, and the slip ratio once increases, even when the torque is decreased to the motor torque command value corresponding to the decreased road surface friction coefficient, the balance state is brought about at the position at which the excessive slip is generated, and the torque needs to be decreased more. Therefore, there arise problems such as the sense of discomfort caused by the change in the longitudinal acceleration and the decrease in the stability of the vehicle. This problem is the problem generated between the road surface and the drive wheels, and even if, for example, a control responsiveness of the electric motor 2 is increased, this problem cannot be solved. Thus, according to the first embodiment, the slip control is thus started in an area of a slip ratio lower than the slip ratio corresponding to the peak value of the road surface friction coefficient in the μ-s characteristic.

Figure 18:
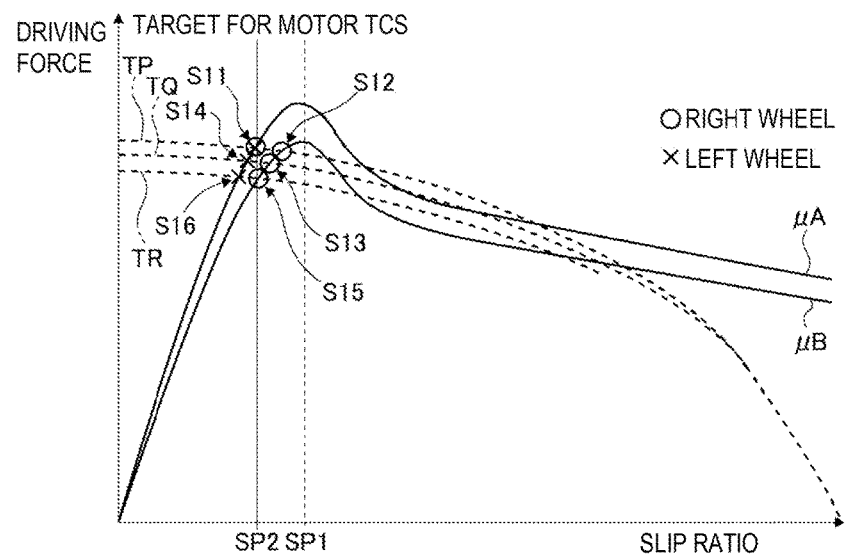
FIG. 18 is a characteristic chart for illustrating the relationship between the slip ratio and the driving force when a μ jump occurs only on a right wheel, and the slip control is carried out according to the first embodiment.

FIG. 18 is a characteristic chart for illustrating the relationship between the slip ratio and the driving force when a μ jump occurs only on the right wheel, and the slip control is carried out according to the first embodiment. As illustrated in FIG. 18, the target slip ratio of the first embodiment is set not to the slip ratio SP1 corresponding to the peak of the μ-s characteristic as in the comparative example but to a slip ratio SP2 lower than SP1. Moreover, in FIG. 18, ○ represents a point for the right wheel, and × represents a point for the left wheel. When the target slip ratio is set, a target drive wheel speed VD* corresponding to this target slip ratio is calculated. The slip control is carried out so that an average wheel speed of the left and right front wheels, which are the drive wheels, follows the target drive wheel speed VD*.

When both the left and right wheels are traveling on the road surface having a road surface friction coefficient of μA, the target slip ratio is set to SP2 lower than the slip ratio SP1 corresponding to the peak of μA. When TP is output as the motor torque command value balancing with the target slip ratio, both the left and right wheels position at a point S11. On this occasion, the slip control is not carried out. Thus, the vehicle is traveling in the balanced state at the high friction coefficient, and the cornering force is secured.

In this state, when a μ jump occurs only on the right wheel, and the road surface friction coefficient changes to μB, the μ-s characteristic for the right wheel moves downward. In the state in which the motor torque command value TP is output, ○ representing the right wheel moves from the point S11 to a point S12 balancing with the road surface friction coefficient μB on the driving force component represented by the dotted line of FIG. 18 and obtained when the motor torque command value TP is output. Note that, the slip ratio at the point S12 is lower than the slip ratio SP1 corresponding to the peak of the μ-s characteristic for the road surface friction coefficient μB, and does not exceed the slip ratio SP1 unlike the comparative example. Thus, even when the road surface friction coefficient μB for the right wheel suddenly changes, the slip ratio does not increase immediately, and a large torque fluctuation and a decrease in the vehicle stability are thus not caused. Then, from such a viewpoint of causing the slip ratio to converge to the target slip ratio SP2, the torque is decreased to such a motor torque command value TQ that an average slip ratio of the left and right wheels reaches the target slip ratio SP2. Then, the slip ratio of the right wheel moves to a point S13 at which the µ-s characteristic of the road surface friction coefficient µB and the motor torque command value TQ balance with each other. The slip ratio of the left wheel moves to a point S14 at which the µ-s characteristic of the road surface friction coefficient µA and the motor torque command value TQ balance with each other. In this way, in the slip control according to the first embodiment, the slip control is started in the area of the slip ratio lower than the slip ratio corresponding to the peak value of the road surface friction coefficient in the µ-s characteristic. Therefore, when the µ jump occurs and the torque is thus decreased, the slip ratio can be caused to converge to the target slip ratio without exceeding the slip ratio corresponding to the peak value in the µ-s characteristic, and hence a large torque decrease is not required. Thus, the change in the slip ratio is small, and the cornering force can thus be constantly secured. Further, an increase in the difference between the left and right driving forces is suppressed, and hence the generation of the unintended moment can be avoided.

Figure 19:
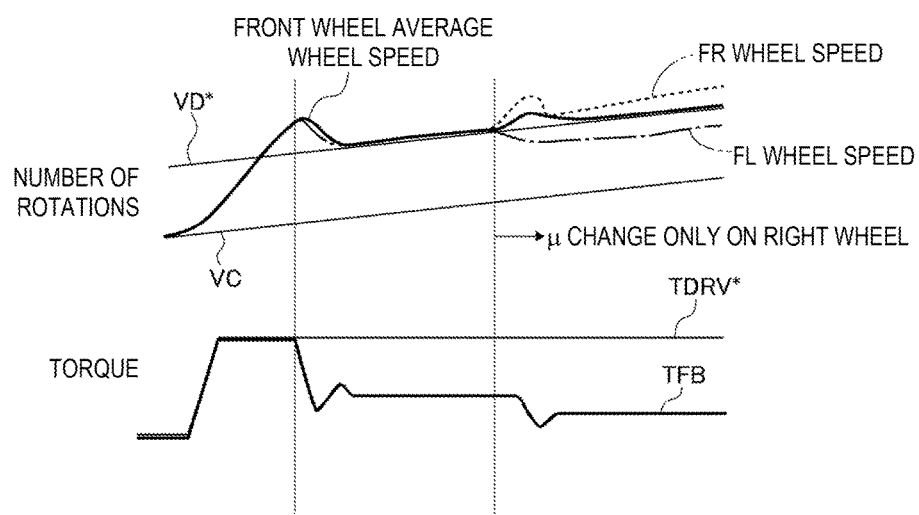
FIG. 19 is a time chart for illustrating a relationship between left and right drive wheel speeds and a motor torque command value when the slip control is carried out according to the first embodiment.

FIG. 19 is a time chart for illustrating a relationship between left and right drive wheel speeds and the motor torque command value when the slip control is carried out according to the first embodiment. The control is provided as follows. In a state in which both the left and right wheels are traveling on the road surface having the road surface friction coefficient µA, at a time point t1 at which the numbers of rotations of the left/right drive wheels that have increased above an estimated body speed VC exceed the target drive wheel speed VD* by a predetermined amount, the torque is decreased by the drive slip control so that the front wheel average wheel speed converges to the target drive wheel speed VD*. At a time point t2, when the µ jump occurs only on the right wheel as described with reference to FIG. 18, the wheel speed of the right wheel immediately increases, and the wheel speed of the left wheel decreases. On this occasion, the torque is decreased by the drive slip control, and the front wheel average wheel speed thus converges to the target drive wheel speed VD*. On this occasion, the wheel speed on the right wheel side is in such a state as to be slightly higher than the wheel speed on the left wheel side, which means a difference in the slip ratio caused by the difference in the road surface friction coefficient when the same driving force is output. The same value can be secured for the driving forces for the left and right drive wheels, and hence the unintended moment and the like are not generated.

A description is now given of actions and effects of such control that the front wheel average wheel speed converges to the target drive wheel speed VD*. For description of the actions and the effects, a description is given while comparing the first embodiment with a comparative example in which not the average of the left and right front wheel speeds, but one wheel speed is caused to converge to the target drive wheel speed VD*. Note that, for the sake of the description referring to FIG. 18, the wheel speed is replaced by the slip ratio. When a µ jump occurs on the front right wheel, the wheel speed of the right wheel immediately increases, and the right wheel slip ratio also increases. Therefore, the slip ratio is controlled so as to converge to the target slip ratio SP2. On this occasion, in order to control the right wheel slip ratio to converge to the target slip ratio, as illustrated in FIG. 18, such a control that the driving force reaches a driving force line TR passing through a point S15 at which the road surface friction coefficient µB and the target slip ratio SP2 balance with each other needs to be provided. When the motor torque command value is TR, the slip ratio of the left wheel balances at a point S16 lower than the target slip ratio SP2. On this occasion, according to the first embodiment, while a slip ratio lower than the peak value of the µ-s characteristic is set to the target slip ratio SP2, an output of the motor torque command value based on the driving force line TR passing through the point S16 corresponding to the slip ratio further smaller than the target slip ratio SP2 can be considered as a state in which the driving force is excessively suppressed.

Thus, a control is provided so that the front wheel average wheel speed converges to the target drive wheel speed VD*, that is, the average slip ratio of the left and right wheels converges to the target slip ratio SP2. As a result, the slip ratio of the right wheel reaches the point S13, which represents the slip ratio higher than the target slip ratio SP2. Due to a configuration of the differential gear 3, a low p road side constitutes a reference of the driving force, and hence, as the motor torque command value, the driving force line TQ passing through the point S13 can be achieved. In other words, by using the front wheel average wheel speed to provide the control, even when only one of the left and right wheels jumps to the low µ side, a drive at a motor torque command value higher than the point at which the µ-s characteristic on the low µ side and the target slip ratio balance with each other can be enabled, and the driving force can thus be secured.

Effects of First Embodiment

Actions and effects provided by the system for controlling a driving force according to the first embodiment are now listed.

(1) There is provided a driving force control device, including: the electric motor 2 (drive source) that is connected to the front wheels FR and FL (drive wheel) of the vehicle via the speed reduction mechanism 3a and the drive shafts 4, and is configured to generate the torque for braking or driving the front wheels FR and FL; the wheel speed sensors 9 (drive wheel speed detection unit) configured to detect the rotational speeds of the front wheels FR and FL; the vehicle body speed estimation unit 512 (vehicle body speed calculation unit) configured to calculate the estimated vehicle body speed VC (vehicle body speed of the vehicle); and the traction control unit 51 configured to reduce, when the drive wheel speed VD exceeds the target drive wheel speed VD* calculated based on the target slip ratio, the driving torque of the electric motor 2, to thereby suppress the slip state of the drive wheels (a slip ratio calculation unit configured to calculate a slip ratio of the drive wheel based on the calculated vehicle body speed and the detected drive wheel speed; and a slip suppression control unit configured to reduce, when the calculated slip ratio is a predetermined slip ratio, a driving torque of the drive source to suppress a slip state of the drive wheel). The target slip ratio (predetermined slip ratio) when the target drive wheel speed VD* is calculated is set to the area of the slip ratio smaller than the slip ratio SP1 corresponding to the peak value of the road surface friction coefficient in the µ-s characteristic (characteristic of the road surface friction coefficient with respect to the slip ratio). In other words, the target slip ratio (predetermined slip ratio) when the target drive wheel speed VD* is calculated is set, in the µ-s characteristic (characteristic of the road surface friction coefficient with respect to the slip ratio), to the area where the change in the slip ratio is in the increase direction and the road surface friction coefficient is in the increase direction, or the area where the change in the slip ratio is in the decrease direction and the road surface friction coefficient is in the decrease direction. Thus, the excess of only one wheel over the μ peak can be avoided, and the increase in the driving force difference between the left and right wheels can thus be avoided. Therefore, without generating the unintended yaw moment, the vehicle behavior can be stabilized. Note that, in the configuration according to the first embodiment, the target slip ratio is calculated, and then the conversion to the slip amount is carried out to carry out the slip control based on the wheel speed, but such a configuration as to carry out the slip control based on a deviation between the actual slip ratio and the target slip ratio is substantially the same as the configuration according to the first embodiment.

(2) In the driving force control device according to Item (1), the drive source is the electric motor 2. Thus, the torque can be reduced at the high responsiveness, and the torque fluctuation and the vehicle instability caused by the excessive slip and the like can be avoided.

(3) In the driving force control device according to Item (1), the target slip ratio is calculated based on a travel state of the vehicle. Thus, an appropriate slip ratio corresponding to the travel state can be set.

(4) The driving force control device according to Item (3) further includes the steering angle sensor 21 (steering angle calculation unit) configured to calculate a steering angle as the travel state of the vehicle. In the steering angle target slip ratio gain calculation unit 513b, the target slip ratio is calculated based on the calculated steering angle. Thus, the target slip ratio corresponding to the straight travel state and the steering state can be set.

(5) In the driving force control device according to Item (4), the target slip ratio when the steering angle is large is calculated so as to be smaller than that when the steering angle is small. In other words, as the steering angle increases, a higher cornering force is necessary, and hence the target slip ratio is reduced. Thus, a large force is not used in a longitudinal direction of the friction circle of the tire, and a force in a lateral direction can be secured.

(6) In the driving force control device according to Item (3), the target slip ratio in a steering travel state is set to be smaller than that in a straight travel state.

In other words, in the straight travel state, a large cornering force is not necessary, and a large force is thus used in the longitudinal direction of the friction circle of the tire. In the steering state, the cornering force is necessary. Therefore, a large force is not used in the longitudinal direction of the friction circle of the tire, and a force in the lateral direction can be secured.

(7) The driving force control device according to Item (3) further includes the vehicle body acceleration calculation unit configured to calculate an acceleration of the vehicle body as the travel state of the vehicle. The target slip ratio when the calculated vehicle body acceleration GC is low is calculated so as to be smaller than that when the calculated vehicle body acceleration GC is high. In other words, when a large acceleration is acquired, a friction force between the drive wheel and the road surface is considered to be secured while a certain slip ratio is permitted, and the driving force can thus be secured by increasing the target slip ratio.

(8) In the driving force control device according to Item (7), the target slip ratio when the steering angle is large is calculated to be smaller than that when the steering angle is small. In other words, as the steering angle increases, a higher cornering force is necessary, and hence the target slip ratio is reduced. Thus, a large force is not used in the longitudinal direction of the friction circle of the tire, and a force in the lateral direction can be secured.

(9) In the driving force control device according to Item (1), according to the first embodiment, the target drive wheel speed VD* is calculated, and the slip control is carried out based on the relationship between the target drive wheel speed VD* and the drive wheel speed, but, when the slip control is carried out based on the relationship between the target slip ratio and the actual slip ratio, the slip ratio can be set based on the average of the numbers of rotations of the front wheels and the vehicle body speed calculated based on the numbers of rotations of the rear wheels.

By using the average of the numbers of rotations of the front wheels, even when only one of the left and right wheels makes a μ jump to the low friction coefficient side, a drive at a motor torque command value higher than the point at which the μ-s characteristic on the low μ side and the target slip ratio balance with each other can be enabled, and the driving force can thus be secured.

Examples of the technological idea that may be acquired from the embodiment are now listed.

(1) There is provided a driving force control device, including: a drive source that is connected to a drive wheel of a vehicle via a speed reduction mechanism and a drive shaft, and is configured to generate a torque for braking or driving the drive wheel; a drive wheel speed detection unit configured to detect a rotational speed of the drive wheel; a vehicle body speed calculation unit configured to calculate a vehicle body speed of the vehicle; a slip ratio calculation unit configured to calculate, based on the calculated vehicle body speed and the detected drive wheel speed, a slip ratio of the drive wheel; and a slip suppression control unit configured to reduce, when the calculated slip ratio is a predetermined slip ratio, a driving torque of the drive source to suppress a slip state of the drive wheel. The predetermined slip ratio is set to an area of the slip ratio smaller than a slip ratio corresponding to a peak value of a road surface friction coefficient in a characteristic of the road surface friction coefficient with respect to the slip ratio.

(2) In the driving force control device according to Item (1), the drive source is a motor.

(3) In the driving force control device according to Item (1), the predetermined slip ratio is calculated based on a travel state of the vehicle.

(4) The driving force control device according to Item (3) further includes a steering angle calculation unit configured to calculate a steering angle as the travel state of the vehicle. The predetermined slip ratio is calculated based on the calculated steering angle.

(5) In the driving force control device according to Item (4), the predetermined slip ratio when the calculated steering angle is large is calculated so as to be smaller than that when the calculated steering angle is small.

(6) In the driving force control device according to Item (3), the predetermined slip ratio in a steering travel state is set to be smaller than that in a straight travel state.

(7) The driving force control device according to Item (3) further includes a vehicle body acceleration calculation unit configured to calculate an acceleration of a vehicle body as the travel state of the vehicle. The predetermined slip ratio when the calculated vehicle body acceleration is low is calculated so as to be smaller than that when the calculated vehicle body acceleration is high.

(8) The driving force control device according to Item (7) further includes a steering angle calculation unit configured to calculate a steering angle. The predetermined slip ratio when the calculated steering angle is large is calculated so as to be smaller than that when the calculated steering angle is small.

(9) In the driving force control device according to Item (1), the slip ratio calculation unit is configured to calculate the slip ratio based on an average of the rotational speeds of the drive wheels and the vehicle body speed calculated based on a number of rotations of a driven wheel.

(10) There is provided a driving force control device, including: a drive source that is connected to a drive wheel of a vehicle via a speed reduction mechanism and a drive shaft, and is configured to generate a torque for braking or driving the drive wheel; a drive wheel speed detection unit configured to detect a rotational speed of the drive wheel; a vehicle body speed calculation unit configured to calculate a vehicle body speed of the vehicle; a slip ratio calculation unit configured to calculate, based on the calculated vehicle body speed and the detected drive wheel speed, a slip ratio of the drive wheel; and a slip suppression control unit configured to reduce, when the calculated slip ratio is a predetermined slip ratio, a driving torque of the drive source to suppress a slip state of the drive wheel. The predetermined slip ratio is set, in a μ-s characteristic representing a relationship of a road surface friction coefficient with respect to the slip ratio, to an area where a change in the slip ratio is in an increase direction and the road surface friction coefficient is in an increase direction, or an area where the change in the slip ratio is in a decrease direction and the road surface friction coefficient is in a decrease direction.

(11) In the driving force control device according to Item (10), the drive source is a motor.

(12) In the driving force control device according to Item (11), the slip ratio calculation unit is configured to calculate the slip ratio based on an average of rotational speeds of the drive wheels, and the vehicle body speed calculated based on a number of rotations of a driven wheel.

(13) The driving force control device according to Item (12) further includes a steering angle calculation unit configured to calculate a steering angle as a travel state of the vehicle. The predetermined slip ratio is calculated based on the calculated steering angle.

(14) In the driving force control device according to Item (13), the predetermined slip ratio when the calculated steering angle is large is calculated so as to be smaller than that when the calculated steering angle is small.

(15) The driving force control device according to Item (14) further includes a vehicle body acceleration calculation unit configured to calculate an acceleration of a vehicle body as the travel state of the vehicle. The predetermined slip ratio when the calculated vehicle body acceleration is low is calculated so as to be smaller than that when the calculated vehicle body acceleration is high.

(16) In the driving force control device according to Item (12), the predetermined slip ratio in a steering travel state is set to be smaller than that in a straight travel state.

(17) There is provided a driving force control method of controlling a torque of a motor that is connected to a drive wheel of a vehicle via a speed reduction mechanism and a drive shaft, and is configured to brake or drive the drive wheel, the driving force control method including controlling the torque of the motor so that a slip ratio of a wheel is set, in a μ-s characteristic representing a relationship of a road surface friction coefficient with respect to a slip ratio, to an area where a change in the slip ratio is in an increase direction and the road surface friction coefficient is in an increase direction, or an area where the change in the slip ratio is in a decrease direction and the road surface friction coefficient is in a decrease direction.

(18) The driving force control method according to Item (17) further includes controlling the torque of the motor so that the slip ratio in a steering travel state is smaller than that in a straight travel state.

(19) The driving force control method according to Item (17) further includes controlling the torque of the motor so that the slip ratio when a steering angle is large is smaller than that when the steering angle is small.

(20) The driving force control method according to Item (17) further includes controlling the torque of the motor so that the slip ratio when a vehicle body acceleration is low is smaller than that when the vehicle body acceleration is high.

Thus, the excess of only one wheel over the μ peak can be avoided, and the increase in the driving force difference between the left and right wheels can thus be avoided. Thus, without generating the unintended yaw moment, the vehicle behavior can be stabilized.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention.

The present application claims a priority based on Japanese Patent Application No. 2013-189386 filed on Sep. 12, 2013. All disclosed contents including Specification, Claims, Drawings, and Abstract of Japanese Patent Application No. 2013-189386 filed on Sep. 12, 2013 are incorporated herein by reference in their entirety.

All disclosures including Specification, Claims, Drawings, and Abstract of Japanese Patent Application Laid-open No. 2011-97826 (Patent Literature 1) are incorporated herein by reference in their entirety.

REFERENCE SIGNS LIST 1 electric motor
2 resolver
3 differential gear
3a speed reduction mechanism
4 drive shaft
5 hydraulic unit
5a hydraulic pipe
6 high-voltage battery
7 converter
8 accessory battery
9 wheel speed sensor
10 inverter
20 power steering controller
21 steering angle sensor
22 meter controller
50 brake controller
51 traction control unit
60 battery controller
100 motor controller
101 changeover switch
103 vibration suppression control information calculation unit
104 vibration suppression control unit
105 motor current control unit
110 vehicle controller
111 driver request torque calculation unit
511 drive wheel speed calculation unit 512 vehicle body speed estimation unit
513 target drive wheel speed reference value calculation unit
514 acceleration slip control start speed calculation unit
515 acceleration slip control end speed calculation unit
516 acceleration slip control flag calculation unit
517 target drive wheel speed calculation unit
518 acceleration slip control torque command value calculation unit
519 slip control torque command value calculation unit
CAN1 first CAN bus
CAN2 second CAN bus
CAN3 first connection bus
FAExecOK acceleration slip control execution permission flag
FA acceleration slip control flag
FDExecOK deceleration slip control execution permission flag
FD deceleration slip control flag
FH ESC state flag
W/C wheel cylinder

The invention claimed is:
1. A driving force control device for a vehicle including
a drive source that is connected to a drive wheel of the vehicle via a speed reduction mechanism and a drive shaft, and is configured to generate a torque for braking or driving the drive wheel, and
a drive wheel speed sensor configured to detect a rotational speed of the drive wheel, the driving force control device comprising a controller configured to:
calculate a vehicle body speed of the vehicle;
calculate, based on the calculated vehicle body speed and the detected drive wheel speed, a slip ratio of the drive wheel;
reduce, when the calculated slip ratio is a predetermined slip ratio, a driving torque of the drive source to suppress a slip state of the drive wheel, and
control the slip ratio of the drive wheel within an area of the slip ratio smaller than a slip ratio corresponding to a peak value of a road surface friction coefficient in a characteristic of the road surface friction coefficient with respect to the slip ratio of the drive wheel, such that the slip ratio of the drive wheel does not exceed the slip ratio corresponding to the peak value.

2. The driving force control device according to claim 1, wherein the drive source is a motor.

3. The driving force control device according to claim 1, wherein the predetermined slip ratio is calculated based on a travel state of the vehicle.

4. The driving force control device according to claim 3, wherein the controller is further configured to calculate a steering angle as the travel state of the vehicle, and
wherein the predetermined slip ratio is calculated based on the calculated steering angle.

5. The driving force control device according to claim 4, wherein the predetermined slip ratio when the calculated steering angle is farther from a neutral position is calculated so as to be smaller than the predetermined slip ratio when the calculated steering angle is closer to the neutral position.

6. The driving force control device according to claim 3, wherein the predetermined slip ratio in a steering travel state is set to be smaller than the predetermined slip ratio in a straight travel state.

7. The driving force control device according to claim 3, wherein the controller is further configured to calculate an acceleration of a vehicle body as the travel state of the vehicle, and
wherein the predetermined slip ratio when the calculated vehicle body acceleration is a first acceleration or less is calculated so as to be smaller than the predetermined slip ratio when the calculated vehicle body acceleration is at least a second acceleration which is higher than the first acceleration.

8. The driving force control device according to claim 7, wherein the controller is further configured to calculate a steering angle, and
wherein the predetermined slip ratio when the calculated steering angle is farther from a neutral position is calculated so as to be smaller than the predetermined slip ratio when the calculated steering angle is closer to the neutral position.

9. The driving force control device according to claim 1, wherein the controller is configured to calculate the slip ratio based on an average of rotational speeds of drive wheels of the vehicle and the vehicle body speed calculated based on a number of rotations of a driven wheel of the vehicle.

10. A driving force control device for a vehicle including
a drive source that is connected to a drive wheel of the vehicle via a speed reduction mechanism and a drive shaft, and is configured to generate a torque for braking or driving the drive wheel, and
a drive wheel speed sensor configured to detect a rotational speed of the drive wheel, the driving force control device comprising a controller configured to:
calculate a vehicle body speed of the vehicle;
calculate, based on the calculated vehicle body speed and the detected drive wheel speed, a slip ratio of the drive wheel;
reduce, when the calculated slip ratio is a predetermined slip ratio, a driving torque of the drive source to suppress a slip state of the drive wheel, and
control the slip ratio of the drive wheel, in a μ-s characteristic representing a relationship of a road surface friction coefficient with respect to the slip ratio of the drive wheel, within an area where a change in the slip ratio of the drive wheel is in an increase direction and the road surface friction coefficient is in an increase direction, or within an area where the change in the slip ratio of the drive wheel is in a decrease direction and the road surface friction coefficient is in a decrease direction, such that the slip ratio of the drive wheel does not exceed the slip ratio corresponding to a peak value of the road surface friction coefficient in the μ-s characteristic.

11. The driving force control device according to claim 10, wherein the drive source is a motor.

12. The driving force control device according to claim 11, wherein the controller is configured to calculate the slip ratio based on an average of rotational speeds of drive wheels of the vehicle, and the vehicle body speed calculated based on a number of rotations of a driven wheel of the vehicle.

13. The driving force control device according to claim 12,
wherein the controller is further configured to calculate a steering angle as a travel state of the vehicle, and
wherein the predetermined slip ratio is calculated based on the calculated steering angle.

14. The driving force control device according to claim 13, wherein the predetermined slip ratio when the calculated steering angle is farther from a neutral position is calculated so as to be smaller than the predetermined slip ratio when the calculated steering angle is closer to the neutral position.

15. The driving force control device according to claim 14, wherein the controller is further configured to calculate an acceleration of a vehicle body as the travel state of the vehicle, wherein the predetermined slip ratio when the calculated vehicle body acceleration is a first acceleration or less is calculated so as to be smaller than the predetermined slip ratio when the calculated vehicle body acceleration is at least a second acceleration which is higher than the first acceleration.

16. The driving force control device according to claim 12, wherein the predetermined slip ratio in a steering travel state is set to be smaller than the predetermined slip ratio in a straight travel state.

17. A driving force control method of controlling a torque of a motor that is connected to a drive wheel of a vehicle via a speed reduction mechanism and a drive shaft, and is configured to brake or drive the drive wheel, the driving force control method comprising:

controlling the torque of the motor so that a slip ratio of the drive wheel is controlled, in a μ-s characteristic representing a relationship of a road surface friction coefficient with respect to a slip ratio of the drive wheel, and controlling the slip ratio of the drive wheel within an area where a change in the slip ratio of the drive wheel is in an increase direction and the road surface friction coefficient is in an increase direction, or within an area where the change in the slip ratio of the drive wheel is in a decrease direction and the road surface friction coefficient is in a decrease direction, such that the slip ratio of the drive wheel does not exceed the slip ratio corresponding to a peak value of the road surface friction coefficient in the μ-s characteristic.

18. The driving force control method according to claim 17, further comprising controlling the torque of the motor so that the slip ratio in a steering travel state is smaller than the slip ratio in a straight travel state.

19. The driving force control method according to claim 17, further comprising controlling the torque of the motor so that when a steering angle is farther from a neutral position, the slip ratio is smaller than the slip ratio when the steering angle is closer to the neutral position.

20. The driving force control method according to claim 17, further comprising controlling the torque of the motor so that the slip ratio, when a vehicle body acceleration is a first acceleration or less, is smaller than the slip ratio when the vehicle body acceleration is at least a second acceleration which is higher than the first acceleration.

* * * * *